United States Patent
Benner, Jr.

(10) Patent No.: US 8,963,396 B2
(45) Date of Patent: Feb. 24, 2015

(54) ELECTROMECHANICAL DEVICE AND ASSEMBLY METHOD

(75) Inventor: William R. Benner, Jr., Longwood, FL (US)

(73) Assignee: Pangolin Laser Systems, Inc., Orlando, FL (US)

( * ) Notice: Subject to any disclaimer, the term of this patent is extended or adjusted under 35 U.S.C. 154(b) by 307 days.

(21) Appl. No.: 13/446,437

(22) Filed: Apr. 13, 2012

(65) Prior Publication Data

US 2013/0076194 A1    Mar. 28, 2013

Related U.S. Application Data

(60) Provisional application No. 61/539,172, filed on Sep. 26, 2011.

(51) Int. Cl.
| H02K 1/14 | (2006.01) |
| H02K 15/02 | (2006.01) |
| H02K 33/16 | (2006.01) |

(52) U.S. Cl.
CPC ............... *H02K 1/148* (2013.01); *H02K 33/16* (2013.01); *H02K 2201/03* (2013.01)
USPC ............... 310/216.022; 310/49.23; 310/49.31

(58) Field of Classification Search
CPC .............................. H02K 1/148; H02K 17/10
USPC .............................. 310/216.022, 49.23, 49.31
See application file for complete search history.

(56) References Cited

U.S. PATENT DOCUMENTS

| 518,561 | A | * | 4/1894 | Brown ......................... 310/40 R |
| 589,543 | A | * | 9/1897 | Brown ............................ 105/49 |
| 742,345 | A | | 10/1903 | Mygatt |
| 2,064,090 | A | * | 12/1936 | Sullivan et al. ........ 310/216.022 |
| 2,251,673 | A | * | 8/1941 | Gillen ........................... 310/172 |
| 2,464,320 | A | * | 3/1949 | Klinkhamer ........... 310/216.011 |
| 2,530,533 | A | * | 11/1950 | Moody ............................ 29/596 |
| 3,109,601 | A | | 11/1963 | Der Hoek et al. |
| 3,434,082 | A | | 3/1969 | Montagu |
| 3,979,616 | A | | 9/1976 | Stechmann |
| 3,984,714 | A | | 10/1976 | Grozinger et al. |
| 4,076,998 | A | | 2/1978 | Montagu |

(Continued)

FOREIGN PATENT DOCUMENTS

| JP | 2003158834 A | 5/2003 |
| WO | 2009040272 A | 4/2009 |

(Continued)

OTHER PUBLICATIONS

Office Action of Aug. 7, 2014 for U.S. Appl. No. 13/446,500.

*Primary Examiner* — Alex W Mok
(74) *Attorney, Agent, or Firm* — Carl M. Napolitano; GrayRobinson, P.A.

(57) ABSTRACT

An electromechanical device includes a rotor and a stator, wherein the stator includes multiple teeth excitable by a coil. The stator is formed from multiple stator sections with one section having a protrusion in spaced relation with a first tooth and a second section having a second protrusion in spaced relation with a second tooth. The protrusions have voids for receiving opposing protrusions in an overlapping manner to integrally form the first stator section with the second stator section. The electrical coil is extended around at least a portion of one tooth before mating the multiple stator sections. The rotor has a diametral magnetized magnet extending into the aperture.

31 Claims, 20 Drawing Sheets

(56) References Cited

U.S. PATENT DOCUMENTS

| | | |
|---|---|---|
| 4,275,371 A | 6/1981 | Vogel |
| 4,302,720 A | 11/1981 | Brill |
| 4,369,385 A | 1/1983 | Malkin et al. |
| 4,408,726 A | 10/1983 | Leonov et al. |
| 4,506,182 A | 3/1985 | Rohdin |
| 4,510,403 A | 4/1985 | Vanderlaan et al. |
| 4,528,533 A | 7/1985 | Montagu |
| 4,533,891 A | 8/1985 | Vanderlaan et al. |
| 4,571,516 A | 2/1986 | Schneiter |
| 4,795,929 A | 1/1989 | Elgass et al. |
| 4,804,934 A | 2/1989 | Finke et al. |
| 4,904,926 A | 2/1990 | Pasichinskyj |
| 4,926,079 A | 5/1990 | Niemela et al. |
| 5,029,379 A | 7/1991 | Niemela et al. |
| 5,225,770 A | 7/1993 | Montagu |
| 5,237,165 A | 8/1993 | Tingley, III |
| 5,275,141 A | 1/1994 | Tsunoda et al. |
| 5,337,030 A | 8/1994 | Mohler |
| 5,369,322 A | 11/1994 | Maruyama et al. |
| 5,424,632 A | 6/1995 | Montagu |
| 5,465,019 A | 11/1995 | Kliman |
| 5,583,387 A | 12/1996 | Takeuchi et al. |
| 5,708,406 A | 1/1998 | Tsunoda et al. |
| 5,729,071 A * | 3/1998 | Steiner .................. 310/216.022 |
| 5,786,651 A | 7/1998 | Suzuki |
| 5,870,010 A | 2/1999 | Ackermann |
| 5,927,249 A | 7/1999 | Ackermann et al. |
| 6,034,461 A | 3/2000 | Sun |
| 6,079,833 A | 6/2000 | Kaelin et al. |
| 6,127,753 A | 10/2000 | Yamazaki et al. |
| 6,243,188 B1 | 6/2001 | Stukalin et al. |
| 6,275,319 B1 | 8/2001 | Gadhok |
| 6,507,257 B2 | 1/2003 | Mohler |
| 6,665,102 B2 | 12/2003 | Maruyama et al. |
| 6,844,653 B2 | 1/2005 | Kolomeitsev et al. |
| 6,880,229 B2 | 4/2005 | Zepp et al. |
| 6,984,911 B2 | 1/2006 | Horie et al. |
| 7,042,130 B2 | 5/2006 | Zepp et al. |
| 7,414,347 B2 | 8/2008 | Wang et al. |
| 7,541,711 B2 | 6/2009 | Adaniya et al. |
| 7,554,240 B2 * | 6/2009 | Lewis et al. ................ 310/261.1 |
| 7,687,948 B2 * | 3/2010 | Sortore et al. .................. 310/71 |
| 7,777,372 B2 | 8/2010 | Tanimoto et al. |
| 7,839,041 B2 | 11/2010 | Mohler |
| D642,265 S | 7/2011 | Hastings |
| 8,212,448 B2 | 7/2012 | Sun et al. |
| 8,284,470 B2 | 10/2012 | Brown et al. |
| 8,482,243 B2 | 7/2013 | Langreck |
| 8,674,649 B2 | 3/2014 | Langreck |
| 2004/0051417 A1 | 3/2004 | Yamazaki et al. |
| 2004/0155549 A1 | 8/2004 | Marioni |
| 2004/0239200 A1 | 12/2004 | Strahan |
| 2005/0093381 A1 | 5/2005 | Ionel et al. |
| 2005/0264111 A1 * | 12/2005 | Tanaka et al. ............... 310/75 C |
| 2006/0290225 A1 * | 12/2006 | Mipo et al. ..................... 310/187 |
| 2007/0120436 A1 * | 5/2007 | Kawasaki et al. ............. 310/217 |
| 2007/0164615 A1 * | 7/2007 | Lewis et al. ..................... 310/12 |
| 2008/0036310 A1 | 2/2008 | Marioni |
| 2008/0054737 A1 * | 3/2008 | Inayama et al. ................. 310/44 |
| 2008/0088187 A1 * | 4/2008 | Shao et al. ....................... 310/51 |
| 2009/0230804 A1 | 9/2009 | Legros et al. |
| 2010/0270893 A1 * | 10/2010 | Bruno et al. ................. 310/68 B |
| 2011/0127872 A1 | 6/2011 | Podack |
| 2013/0076185 A1 | 3/2013 | Benner |
| 2013/0076194 A1 | 3/2013 | Benner |
| 2013/0200742 A1 | 8/2013 | Seki et al. |

FOREIGN PATENT DOCUMENTS

| | | |
|---|---|---|
| WO | 2009083898 A | 7/2009 |
| WO | WO 2009083898 A1 * | 7/2009 |

* cited by examiner

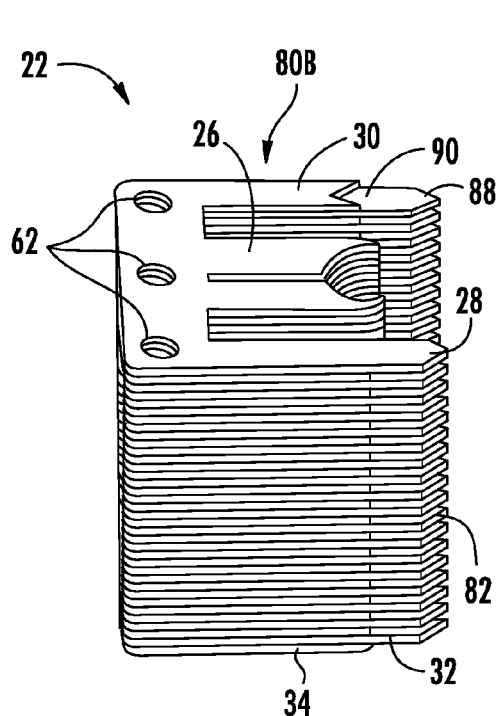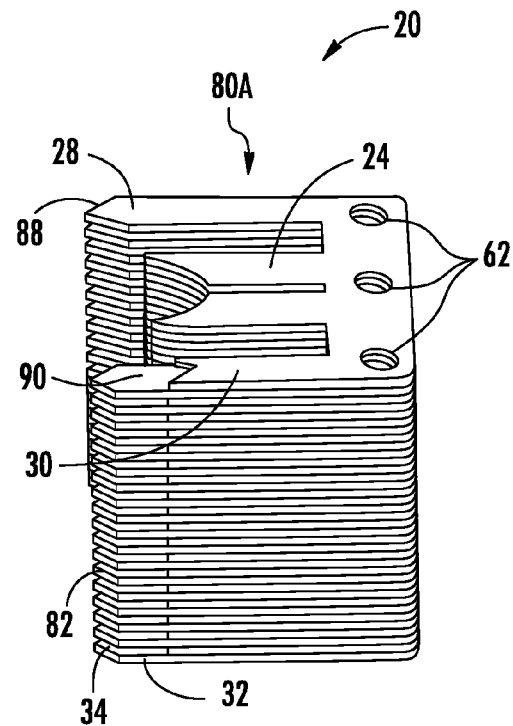
FIG. 6A    FIG. 6B
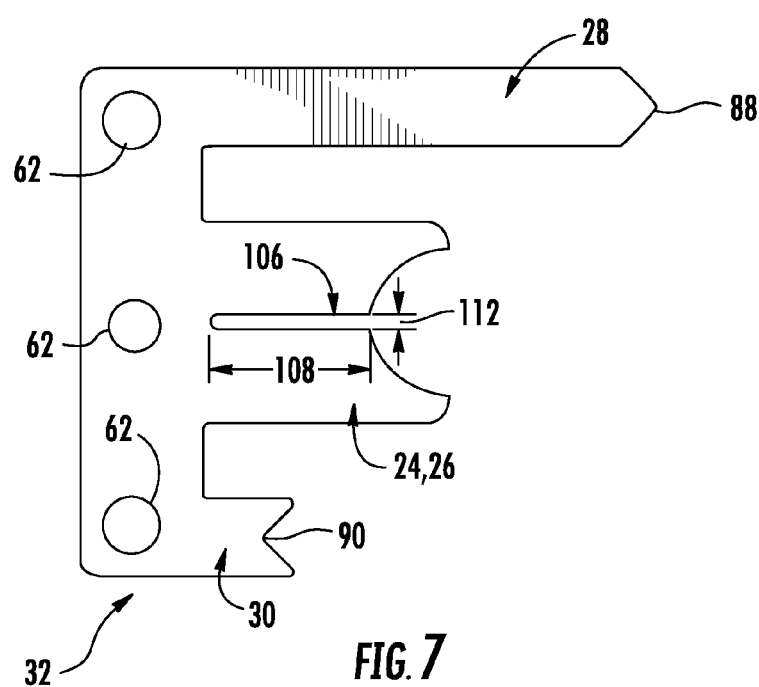
FIG. 7

ELECTROMECHANICAL DEVICE AND ASSEMBLY METHOD

CROSS REFERENCE TO RELATED APPLICATION

This application claims priority to application Ser. Nos. 61/539,172 having filing date of Sep. 26, 2011 for Electromechanical Rotary Actuator and Method, the disclosure of which is incorporated herein by reference, and commonly owned.

FIELD OF THE INVENTION

The present invention generally relates to electromechanical devices and in particular to electromechanical device formed from multiple stator sections to facilitate installation of electrical coil and improve rotor performance.

BACKGROUND OF THE INVENTION

Electromechanical rotary actuators are well known and are used in a variety of industrial and consumer applications. They are particularly useful in the field of optical scanning, where an optical element is attached to an actuator output shaft, which is then rotated back and forth in an oscillating manor.

For example, it is common to attach a mirror to the output shaft of a rotary actuator in order to create an optical scanning system. In this application, the actuator/mirror combination can redirect a beam of light through a range of angles, or redirect the field of view of a camera so that it can observe a variety of targets.

Other optical elements can be attached to the output shaft as well. For example, a prism or an optical filter can be attached to the shaft and the rotation of the actuator shaft can vary the angle of the prism or filter. If a dielectric filter is used, changing the filter's angle-of-incidence will shift the bandpass wavelength characteristics higher or lower, thus allowing the optical system to be tuned to a particular wavelength. Alternatively, the prism or filter can be rotated completely into and out of the beam path, thus allowing selective filtering of the beam.

Yet another application is to attach an arm to the actuator output shaft, with the arm being made of opaque material such as blackened metal. The rotation of the actuator shaft rotates the arm into and out of the beam path, thus providing a shuttering action.

Many well known rotary actuators provide only two discreet rotation angles, and the purpose of the actuator is to vary the output shaft between these two angles in a kind of digital, on-off fashion. These actuators are also usually accompanied by a type of mechanical shock effect (vibration), where the rotating inertial load must suddenly come to a stop at the end of angular travel. This mechanical shock is highly undesirable for optical applications, because this shock can be coupled to other optical elements, creating disturbances as well as acoustic noise.

In addition to shock-free actuation, optical scanning related applications also desire that the accessible range of rotation angles be virtually infinite, as well as being controllable and repeatable, in an analog fashion. Sometimes a rotation angle of 5 degrees might be needed, and other times a rotation angle of 10 degrees might be needed. Still other times, some intermediate angle might be needed, for example 6.54 degrees.

With the desirable range of output angles virtually infinite, there is a requirement that there be some method of controlling the actuator output angle, based on an external signal. To this end, two methods exist—open-loop control and closed-loop control.

When open-loop control is used, the actuator generally must have some spring-like return mechanism, such that when no current is applied to the actuator, the spring-like mechanism will return the shaft to a nominal angle. Then, when the amount of input current that is applied to the actuator is varied, this will vary the amount of torque produced by the actuator, and thus vary the amount of torque applied to the spring, which then will control the output angle of the actuator. In this way, there is a direct relationship between the output angle produced by the actuator and the input current applied to the actuator. However, the degree of linearity of the open-loop control depends strongly on the torque-versus-angle characteristics of the actuator, and also the torque-versus-angle characteristics of the spring-like return mechanism. Hysteresis effects within the materials or construction may also degrade the output angle versus input current relationship, and thus degrade repeatability. And finally, the speed of open-loop control depends on the amount of overshoot that is acceptable. If higher speeds are required, normally more sophisticated control methods are needed to artificially add damping to the system in order to control overshoots.

When closed-loop control is used, the actuator must incorporate an angular position sensor, which is generally externally attached. A servo system then applies current to the actuator to move the shaft in a direction to minimize the difference between the external commanded angle and the actuator output angle sensed by the angular position sensor. Closed-loop control can provide much greater speed, linearity and repeatability, but is of course more complex and more expensive, due to the required angular position sensor and servo control electronics.

Whether open-loop control or closed-loop control is used, it is desirable within the field of optical scanning, that the performance of the actuator be predictable when external current is removed—such as return the output shaft to a nominal, central angular position. In many well known actuators, this return-to-center action is provided by a metal spring, which can be a coil spring, leaf spring or torsion rod. In yet other known actuators, the magnetic construction or additional magnets are used to return the actuator to the center.

As it pertains the return-to-center mechanism, while metal springs can provide a linear return-force-versus-angle characteristic over a range of angles, there is a finite angular range over which they can work as desired, which is normally 25 degrees or less. Exceeding the designed range of angles will result in greatly reduced lifetime or even instantaneous breakage of the spring. And while magnetic construction techniques or additional magnets can provide a return-to-center action that does not fatigue or break, the return-force-versus-angle characteristic is generally not linear and in fact, can be highly non-linear.

Within the field of optical scanning and also within other fields, it can be desirable for the actuator to provide as wide an angular output range as possible. When a mirror is attached to the output shaft, a wider angle from the actuator provides a wider scan angle. When an opaque element is attached to the actuator, a wider angle from the actuator provides a greater degree of shuttering. However, well known commercially available actuators have not been found which provide an angular range greater than around +/−25 mechanical degrees along with analog control capability.

There is a need for an electromechanical rotary actuator that provides wide angle capability, and that can provide a linear current-versus-angle characteristic. Yet further, there is a need for such an actuator to also provide a self-damping characteristic to improve the speed when used with open-loop control.

SUMMARY OF THE INVENTION

In keeping with the teachings of the present invention, an electromechanical device may comprise a stator having an aperture extending axially therein, wherein the stator includes at least two teeth, with each tooth of the at least two teeth extending toward the aperture. The stator includes multiple stator sections with at least one of a first stator section having a first protrusion in spaced relation with a first tooth and a second stator section having a second protrusion in spaced relation with a second tooth. The first protrusion has a first void therein for receiving the second protrusion therein, and the second protrusion has a corresponding second void therein for receiving the first protrusion therein in an overlapping manner to integrally form the first stator section with the second stator section. A rotor may include a shaft having a diametral magnetized magnet extending into the aperture. An electrical coil extends around at least a portion of one tooth, wherein the electrical coil is excitable for magnetizing the at least one tooth.

A method aspect of the invention includes assembling the device by providing multiple stator sections, wherein a first stator section includes a first protrusion in spaced relation with a first tooth, wherein the first protrusion includes a first void therein, and wherein a second stator section includes a second protrusion in spaced relation with a second tooth, the second protrusion having a second void therein. An electrical coil is then formed around at least a portion of one tooth of the first and second teeth, wherein the electrical coil is excitable for magnetizing the at least one tooth. The first protrusion of the first stator section is placed into the second void of the second stator section and the second protrusion of the second stator section is placed into the first void of the first stator section in an overlapping manner to result in integrally forming the first stator section with the second stator section to form a stator having at least two teeth and an aperture between free ends thereof.

One embodiment may comprise an electromagnetic actuator, whose angular range of motion exceeds +/−80 mechanical degrees, and whose structure makes it desirably easy to assemble and desirably inexpensive to manufacture. Embodiments may provide a linear output-angle versus input-current characteristic and may also provide self-damping.

BRIEF DESCRIPTION OF THE DRAWINGS

For a fuller understanding of the invention, reference is made to the following detailed description, taken in connection with the accompanying drawings illustrating various embodiments of the present invention, in which:

FIGS. 6A and 6B show the individual stator sections—in this case, a left half and right half of the stator assembly;

FIG. 7 illustrates the top view of an individual lamination with features identified;

DETAILED DESCRIPTION OF THE PREFERRED EMBODIMENTS

Figure 1:
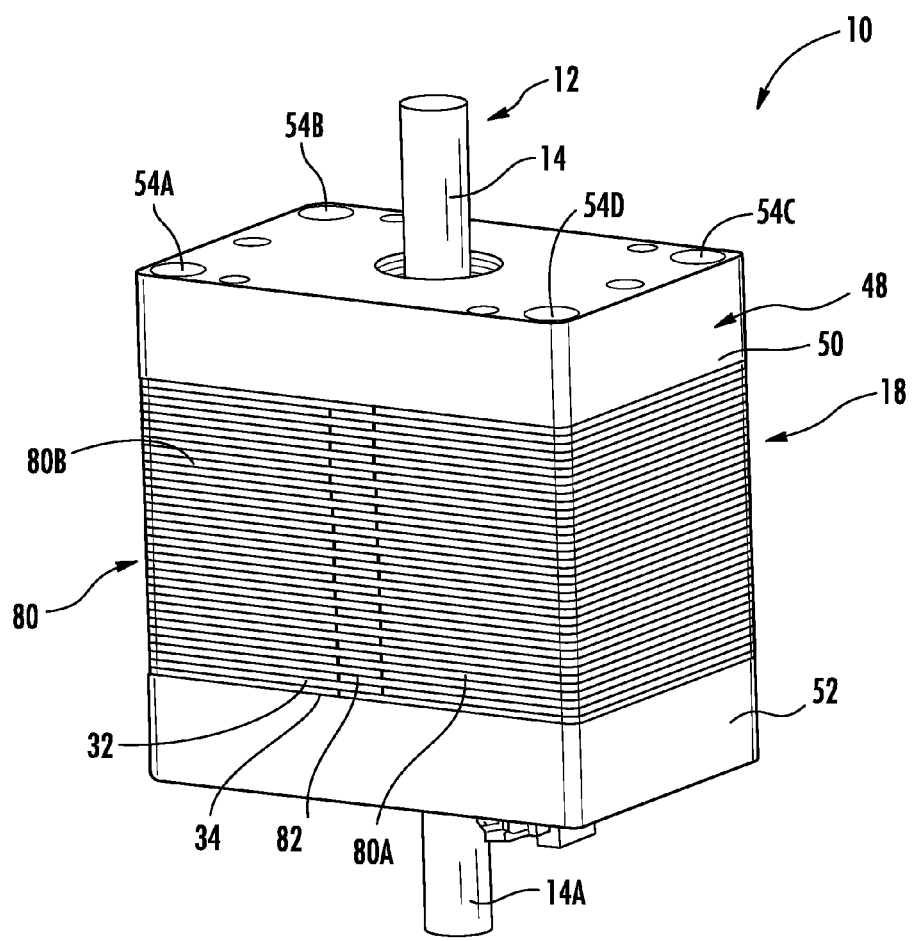
FIG. 1 illustrates the electromechanical actuator of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1, 2, 3 and 4, one embodiment of the present invention is herein described, by way of example, as an electromechanical rotary actuator 10 comprising a rotor assembly 12 having a shaft 14 and at least one magnet 16 operable with the shaft. A stator assembly 18 comprises at least two stator sections 20, 22, wherein each stator section includes a tooth 24, 26 extending toward the magnet 16. First and second protrusions 28, 30 from each of the stator sections 20, 22 are integrally formed through an interleaved joining of alternating adjacent laminations 32, 34 forming the stator sections 20, 22. The protrusions 28, 30 are spaced from each tooth 24, 26. Each tooth 24, 26 within each stator section 20, 22 includes a concave shaped free end 36, 38 together forming an aperture 40 receiving the magnet 16, as further illustrated with reference to FIG. 5. Electrical coils 42, 44 extend around each tooth 24, 26 in each of the stator sections 20, 22.

Note that terms left, right, top and bottom are herein used in the description to aid in understanding embodiments of the invention while reading the specification and viewing the drawings. These terms are generally relative to the drawing, and are not intended to be limiting.

Figure 2:
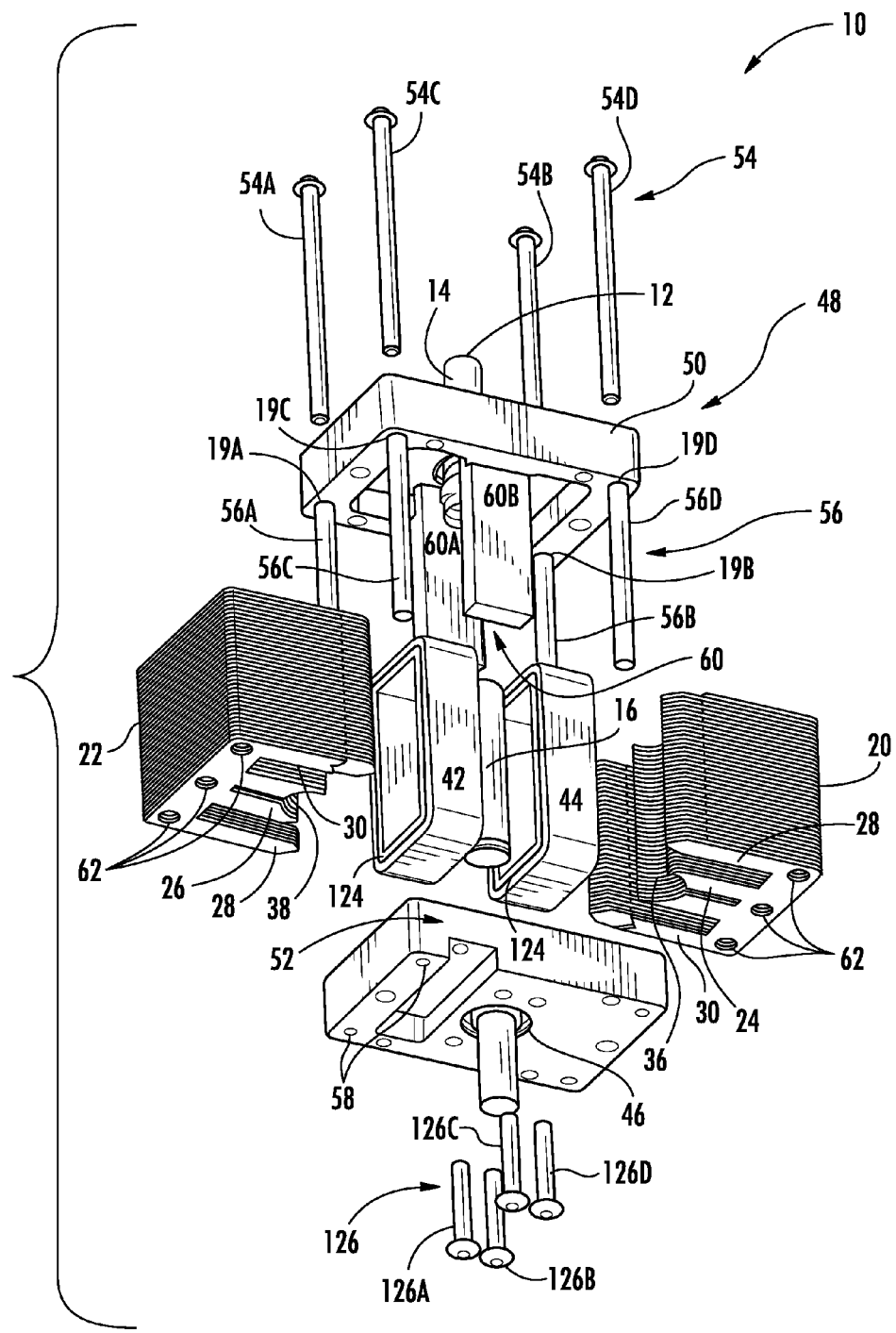
FIG. 2 illustrates an exploded view of the actuator of the present invention.
Figure 3:
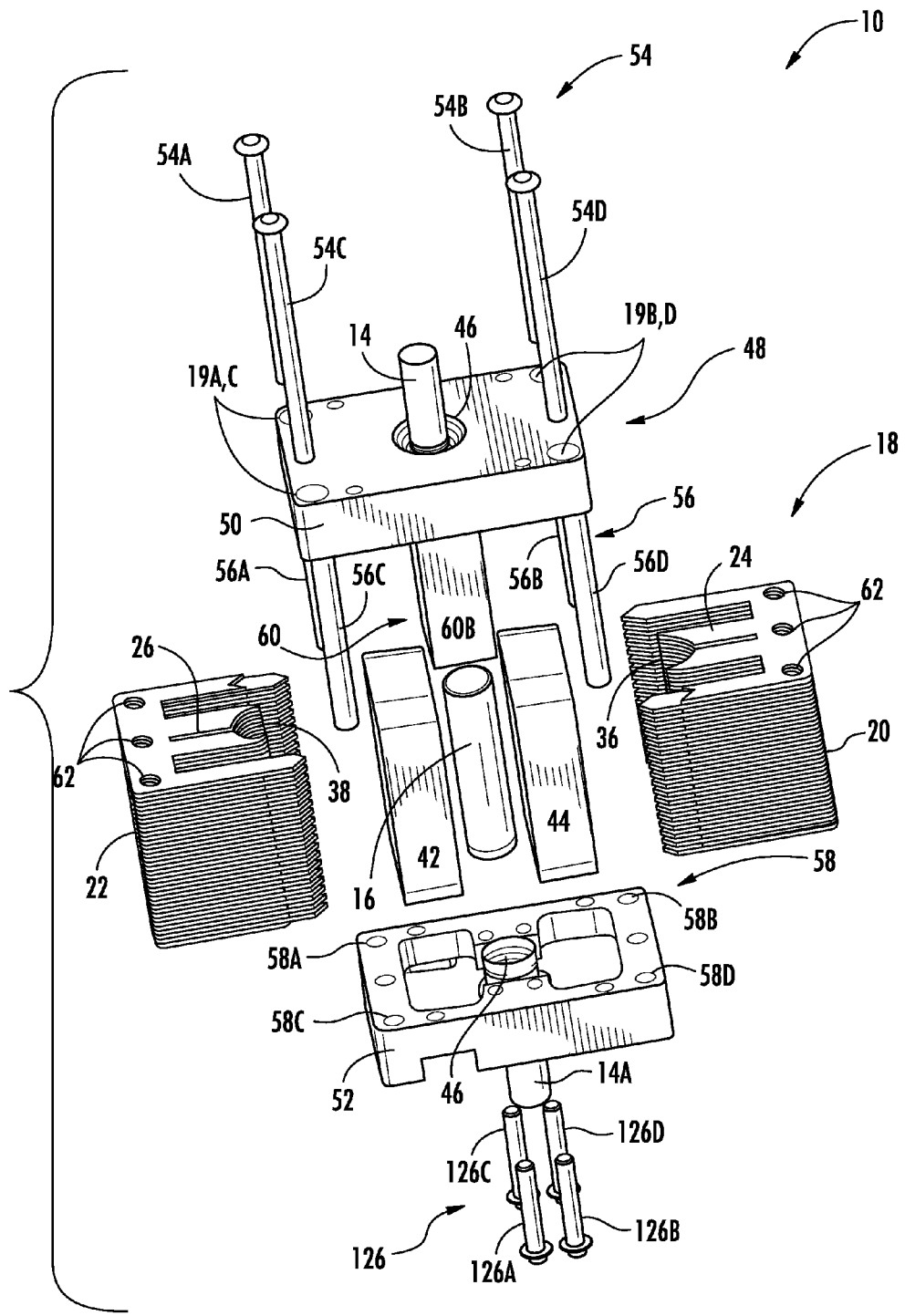
FIG. 3 illustrates another exploded view of the actuator of the present invention.

With continued reference to FIGS. 1-3, the actuator 10, herein described by way of example, includes the rotor assembly 12 and the stator assembly 18 with a rotor support 46, and a housing 48 having a front face 50 and a rear face 52. The front face 50 and the rear face 52 are secured to each other using housing screws 54, herein identified as 54A, 54B, 54C and 54D and housing tubes 56, herein identified as 56A, 56B, 56C and 56D. As described with continued reference to FIGS. 2 and 3, the rotor support 46 includes ball bearings. Holes 58 herein identified as 58A, 58B, 58C and 58D are located in the front face 50 and the rear face 52 for receiving the tubes 56. As will be described in greater detail later in this section, central struts 60, herein two struts 60A, 60B, are connected between the faces 50, 52. The four housing tubes 56 are directed through holes 62 in the laminations 32, 34. As illustrated, there may be four, six or other amounts of holes 62 as desired. The housing tubes 56 hold the laminations 32, 34 4 into a desirable alignment. The housing tubes 56 further go through the holes 58 in the housing faces 50, 52. The housing screws 54 hold this combination of structural elements together.

Note that there are other possible methods of holding the stator assembly 18 into a precise alignment with respect to the rotor assembly 12, and therefore although the housing 48 described here is used in an exemplary embodiment, this is not intended as a limitation. Any known means of holding the actuator components together may be used.

As above described and with continued reference to FIGS. 2 and 3, the actuator 10 also includes the rotor support 46. In a preferred embodiment, the rotor support 46 comprises ball bearings, which are mounted on the output shaft 14 and optional on an auxiliary shaft 14A, and attach to the front face 50 and the rear face 52, respectively, for suspending the rotor assembly 12 into a precise, central radial position, while allowing the rotor assembly to rotate freely. Note however that a flexure may also be used as the rotor support 46.

As described above, and as illustrated with reference again to FIG. 4, the rotor assembly 12, the rotating portion the actuator 10, comprises the output shaft 14 and the rotor magnet 16. Alternate embodiments may also include the auxiliary shaft 14A onto which an angular position sensor, by way of example, or other external items may be attached as desired.

Figure 4:
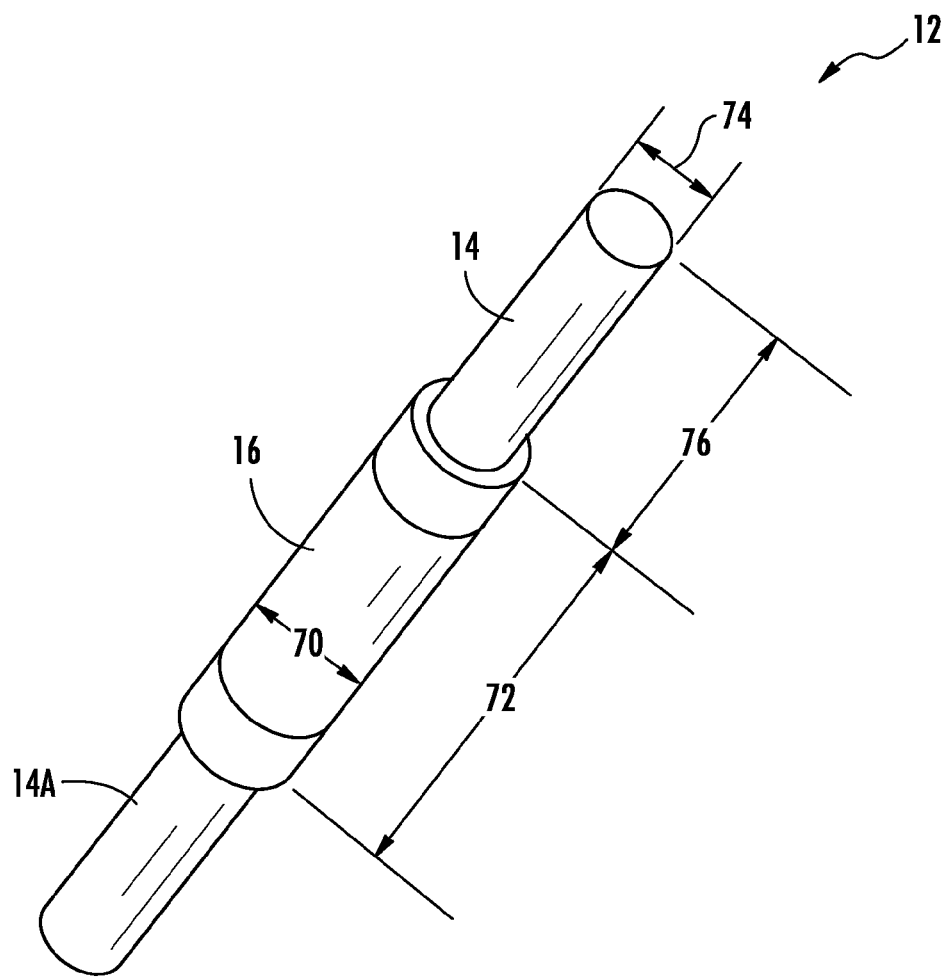
FIG. 4 illustrates one rotor assembly of the present invention including a magnet and shaft.
Figure 5:
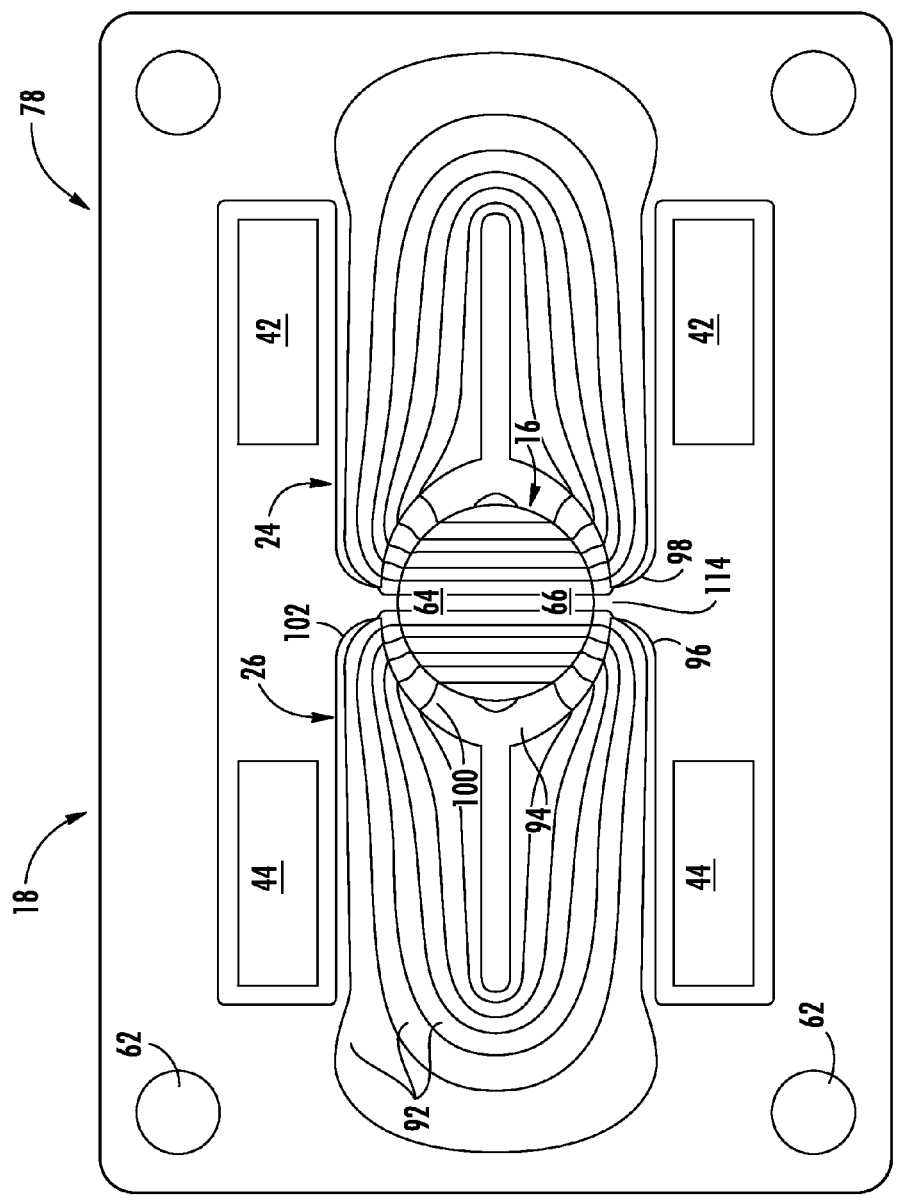
FIG. 5 diagrammatically illustrates one magnetic circuit in keeping with the teachings of the present invention.

With continued reference to FIG. 4, in one preferred embodiment, the rotor magnet 16 may be a single, solid, cylindrical magnet with a single north pole 64 and a single south pole 66, as illustrated with reference to FIG. 5. The magnet 16 may be magnetized in such a way to provide a radial flux, and as such, the magnet is "diametral" magnetized, providing the north pole 64 that is diametrically opposed to the south pole 66. As herein described, the diametral magnetized magnet 16 thus provides flux lines 66 generally extending in one direction through the magnet, as illustrated with reference again to FIG. 5. Although a cylindrically shaped rotor magnet 16 is preferred, other shapes will also work, such as a shape where the sides are flattened having flattened surfaces. It is also possible to use multiple magnets as long as they are magnetized and aligned to provide the flux lines 66 in the desired orientation, as will be described in greater detail below. Moreover, although a preferred and exemplary embodiment uses the two-pole magnet 16, it is also possible to use a rotor magnet with a greater number of poles, as long as the number of stator teeth 24, 26 is adjusted accordingly.

In one preferred embodiment, the magnet 16 is made from sintered Neodymium-Iron-Boron material. This provides a desirably high flux output and allows the actuator 10 to operate at temperatures ranging from around −55 degrees Celsius to over +100 degrees Celsius, depending on the grade of the magnet material. However, other materials for the magnet 16 may be used, such as AlNiCo, Samarium-Cobalt, Ceramic materials, and the like. The materials for the magnet 16 may also be bonded, for example bonded Neodymium-Iron-Boron or Bonded Samarium-Cobalt, which would provide lower rotor inertia, but also lower flux output and thus, lower torque output.

In a preferred embodiment, the output shaft 14 and optional auxiliary shaft 14A are made of stainless steel, although practically any material can be used as long as the material can withstand the torque produced by the actuator 10 and any external load connected to the actuator within the environment being operated.

Further, the output shaft 14 and optional auxiliary shaft 14A may be integrally formed with the magnet 16 or may be attached to the magnet using adhesive such as epoxy. However any known adhesive can be used as long as it can withstand the torque and any side loads placed on the rotor assembly 12. It is also possible to create a rotor assembly 12 with a single shaft that extends through a hole in the magnet 16, or with a single shaft onto which multiple magnets are attached.

With reference again to FIG. 4, in an exemplary embodiment, the rotor magnet 16 has a diameter 70 of 0.25 inches and an axial length 72 of 1 inch, and the output shaft 14 and the auxiliary shaft 14A have a diameter 74 of 0.187 inches and an axial length 76 that extends 0.75 inches in each axial direction. The resulting rotor inertia is 0.55 Gram-Centimeters Squared. Although these parameters are for an exemplary manufactured embodiment, they are not intended to be limiting.

With reference again to FIGS. 1-3, and now to FIGS. 6A and 6B, the stator assembly 18, the portion of the actuator 10 remaining stationary relative to the rotor assembly 12, comprises multiple, thin, sheets of metal, herein referred to as the laminations 32, 34, as above described. The laminations 32, 34 assembled into the stator sections 20, 22 are formed into a desired shape to enhance a magnetic circuit 78, illustrated with reference again to FIG. 5. The shape of each lamination 32, 34 may be created by metal stamping, by laser cutting, by photo-etching, by water-jet cutting, or by other known methods of forming a shape from sheet metal. In a preferred embodiment, the laminations 32, 34 are made from a silicon-steel material known as M-19, a material specially made for motors and electrical transformers. However, many different materials will work, as long as the material is magnetically conductive. A few possible alternative materials include a cold-rolled steel (for example Q-195) and magnetic stainless steel (stainless steel 416 by way of example).

Figure 8:
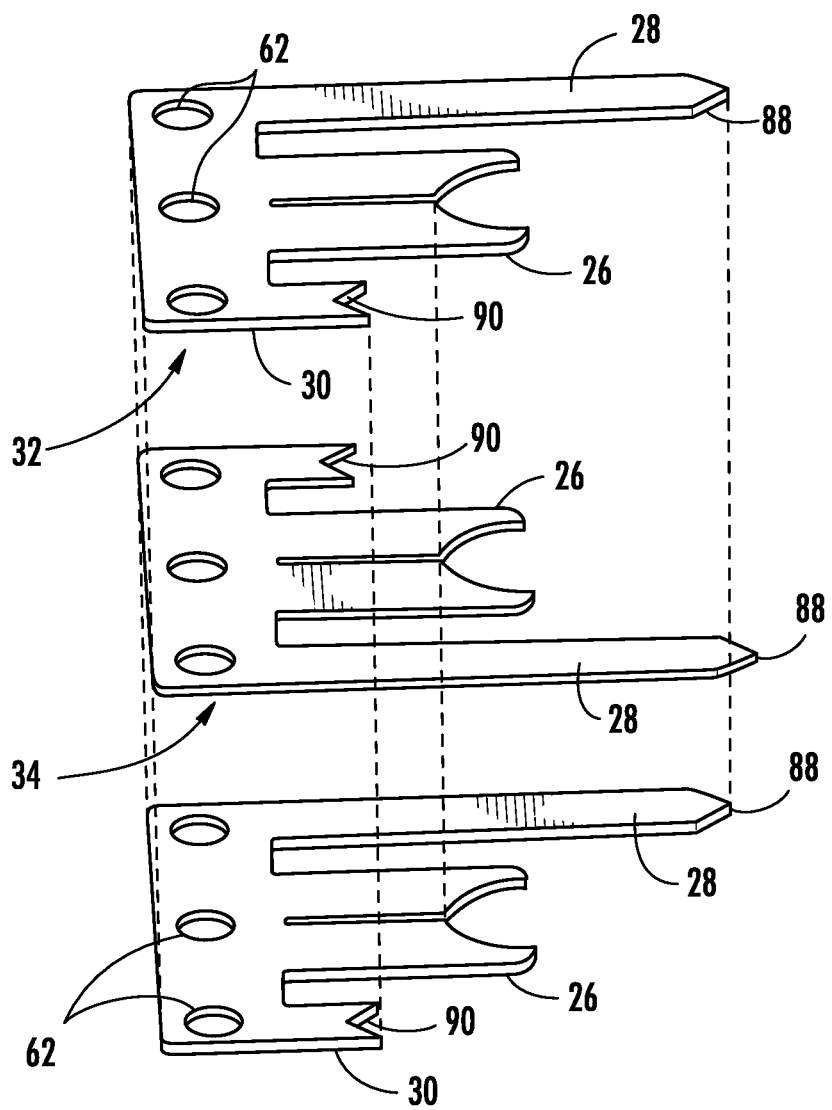
FIG. 8 illustrates how the laminations are arranged in layers and how they are stacked with point and socket alternating layer by layer to form a stator section.

As will herein be described, by way of example, a lamination structure 80 forming a portion of the stator assembly 18, illustrated with reference to FIG. 1, is created by joining laminated structures 80A, 80B for the stator sections 20, 22 by selectively interspersing the first and second protrusions 28, 30 above described with reference to FIGS. 2 and 3, and now further detailed with continued reference to FIGS. 6A and 6B, and now to FIGS. 7 and 8.

As illustrated with reference to FIGS. 7 and 8, each lamination 32, 34 has point-shaped protrusion 28, and a socket-shaped protrusion 30. For the embodiment herein described, by way of example, each has a tooth 24, 26, described earlier with reference to FIGS. 2 and 3, that is radially-inward-facing. As above described, the stator sections 20, 22 are formed by stacking the laminations 32, 34, layer by layer as illustrated with reference to FIG. 8, in such a way that, on every other layer, the point-shaped protrusions 28 and socket-shaped protrusions 30 are alternated, as illustrated with reference to FIGS. 6A and 6B for layered laminations 80A, 80B. It should be noted that although this is a preferred method of construction, other stacking methods are also possible, including, for example a method where two laminations 34 have point shaped protrusions 28 pointing toward the right, followed by two laminations 32 that have point shaped protrusions 28 pointing toward the left. The stator sections 20, 22 having the laminations 80A, 80B are then slid together to form the completed stator assembly 18 having the laminations 80, illustrated with reference again to FIG. 1.

Figure 8A:
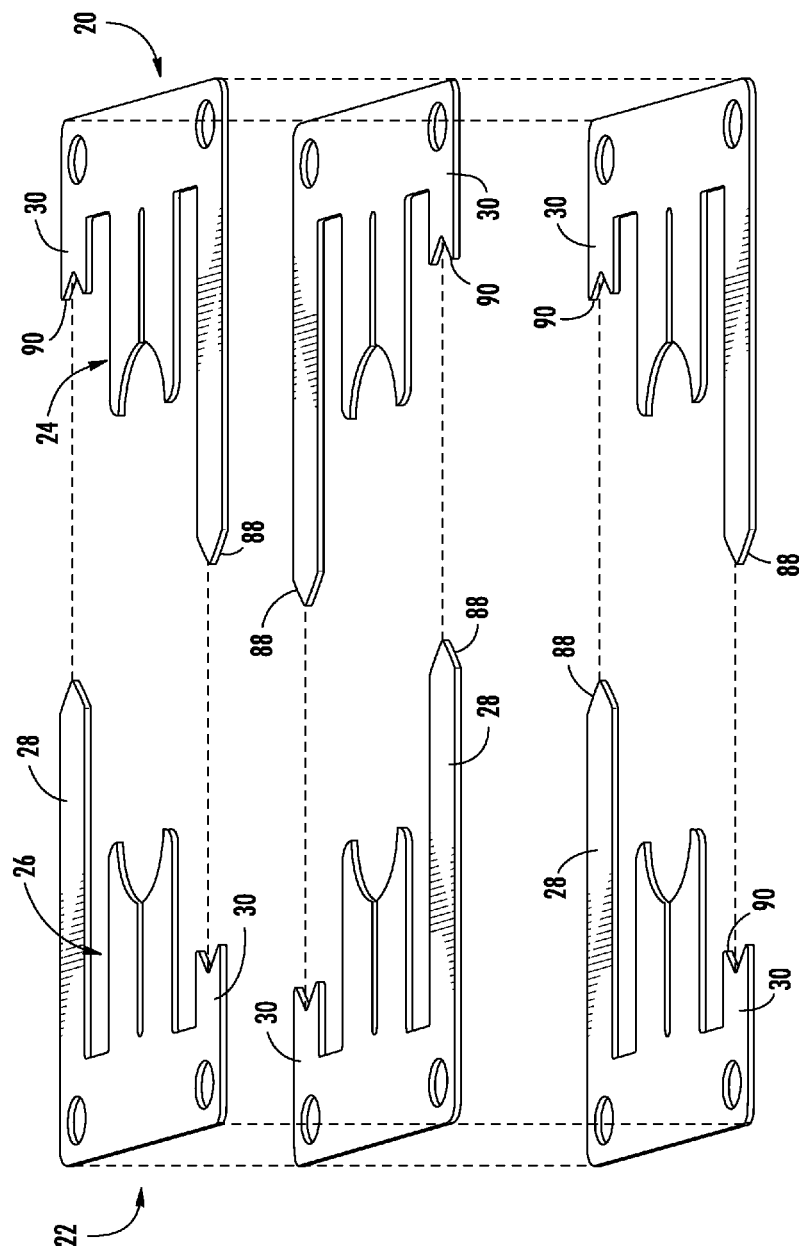
FIGS. 8A and 8B illustrate how the laminations within layers will come together in a mating fashion with point and socket alternating layer by layer to form the stator.
Figure 8B:
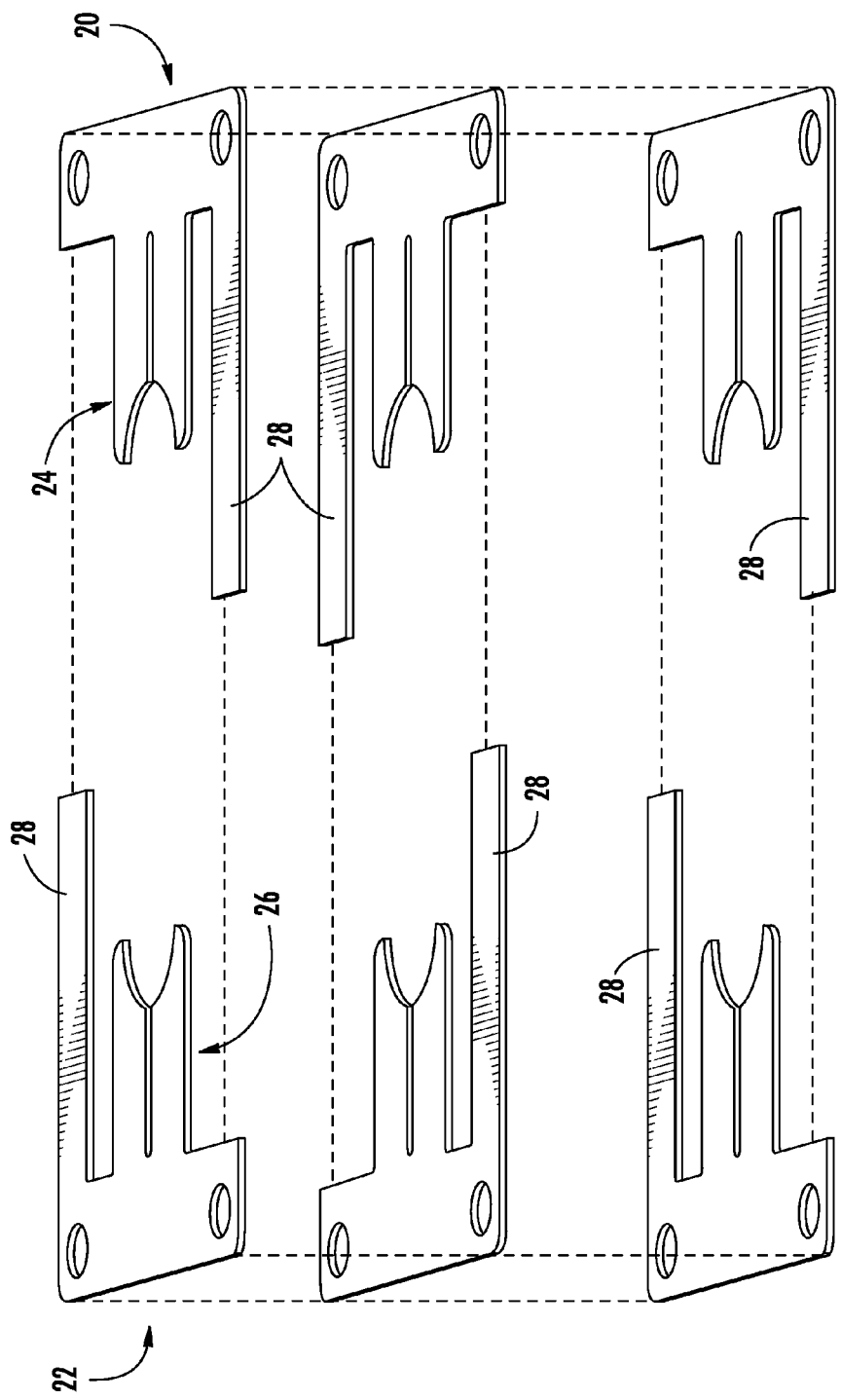

By way of further example, FIGS. 8A and 8B illustrates how the laminations within layers will come together in a mating fashion with point and socket alternating layer by layer to form the stator.

Figure 9:
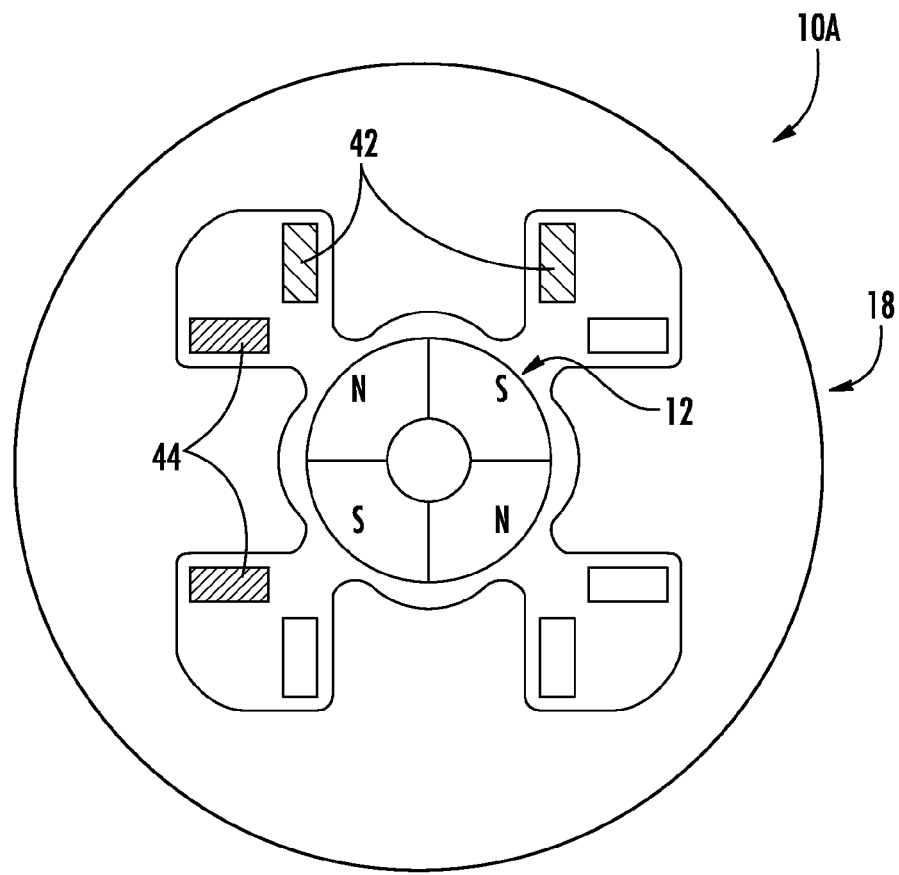
FIGS. 9 and 9A illustrate four-pole and three-tooth embodiments, respectively, according to the teachings of the present invention.
Figure 9A:
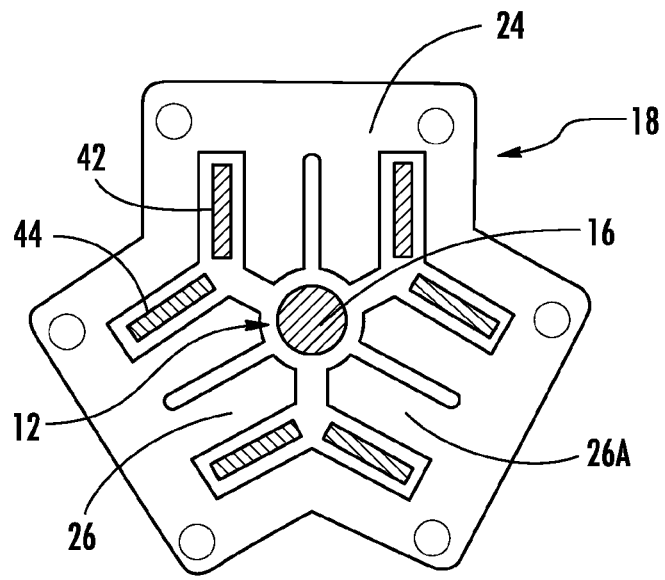
Figure 9B:
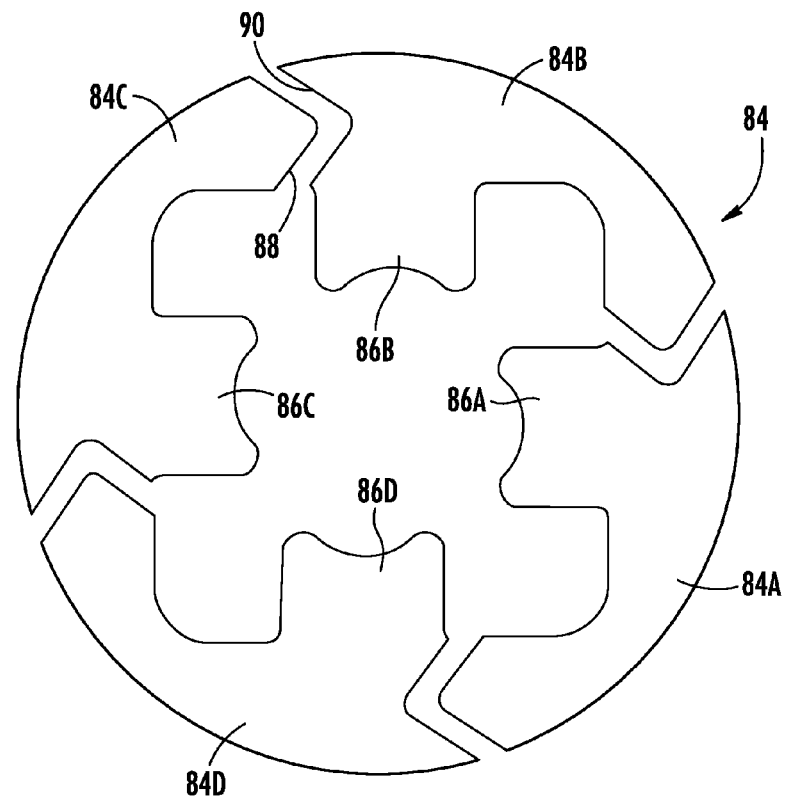
FIG. 9B illustrates one possible way in which the four-pole embodiment may be split into sections.

In one preferred embodiment as herein described by way of example, there are only the two stator sections 20, 22, a right and a left stator section, respectively. This is the preferred configuration for use with the rotor assembly 12 whose magnet 16 has two poles 64, 66, as above described. However, it is also possible to create an actuator 10A with three or more stator sections, such as the four pole embodiment illustrated with reference to FIG. 9 or the three pole embodiment illustrated with reference to FIG. 9A, as long as there is an overlapping area 82 within the laminations 80 of the stator sections, as illustrated with reference again to FIGS. 1, 6A and 6B. As illustrated with reference to FIG. 9A, the three pole embodiment comprises multiple teeth 24, 26, 26A, by way of example. In addition, while each stator section 20, 22 as above described by way of example, includes a single tooth 24, 26, a single stator section 84 may comprise multiple teeth or a single tooth 86, as illustrated with reference to FIG. 9B, wherein a stator section 84A includes tooth 86A, stator section 84B includes tooth 86B, stator section 84C includes tooth 86C, and stator section 84D includes tooth 86D.

Figure 10:
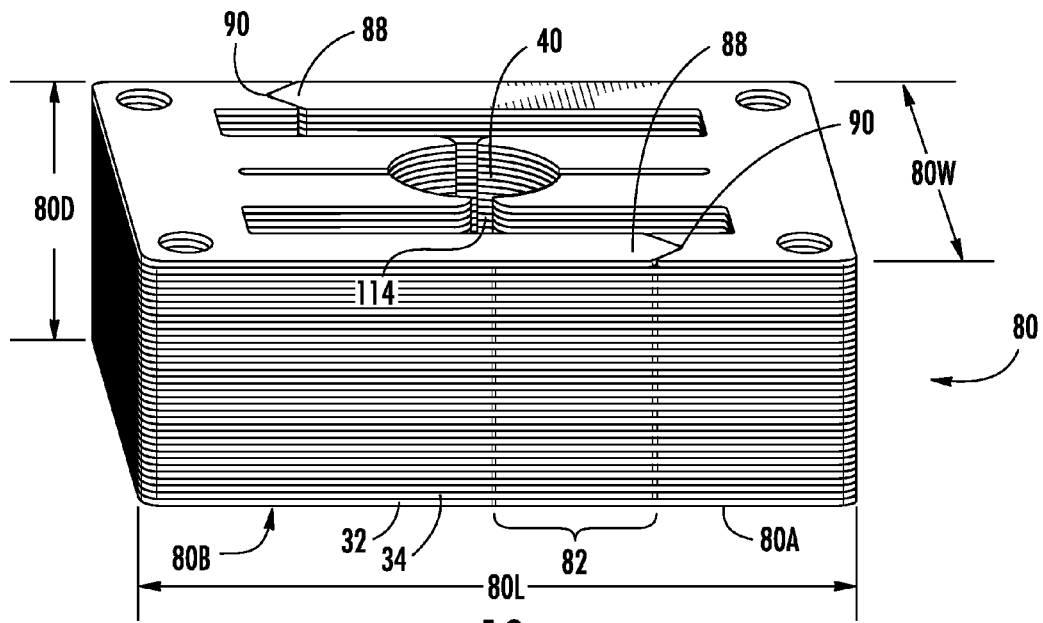
FIG. 10 illustrates a stator assembly of the present invention including two stator sections.
Figure 10A:
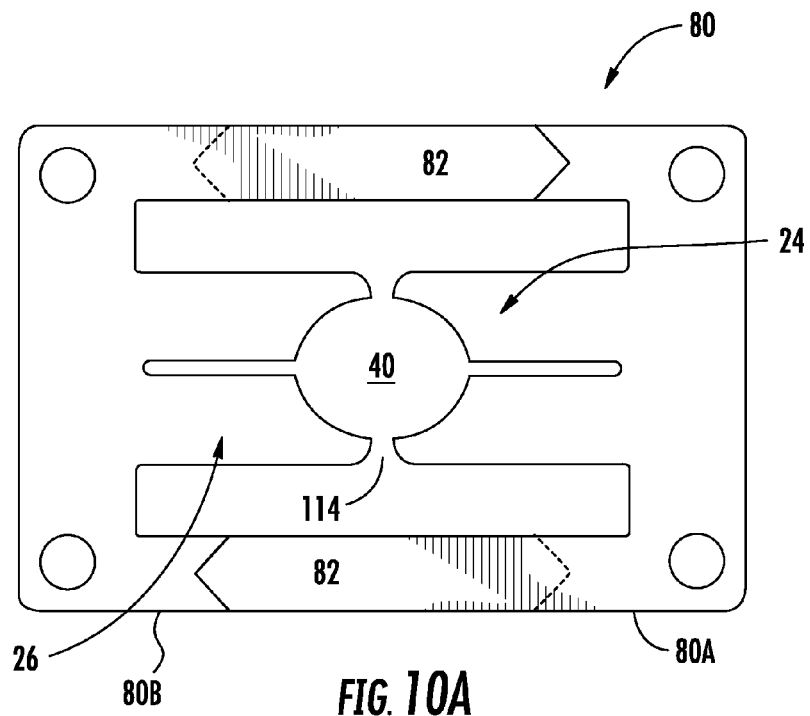
FIG. 10A illustrates the top view of laminations assembled into a stator assembly, and identifies the overlapping area of lamination layers.

In typical stator assemblies that use a point-and-socket approach, the orientation of the laminations is the same in all layers. Because of this, there is always a small air-gap between the point and the socket, since the surfaces can never be made to fit perfectly. Because of the small air-gap, the magnetic permeability is lower and magnetic reluctance is higher when compared to a single lamination that is not split. This degrades actuator performance. By contrast, within embodiments of the present invention, the point 88 and socket 90 placements are alternated on each lamination layer 32, 34, creating the overlapping area 82 between the laminations 32, 34, as illustrated with reference again to FIGS. 1, 6A and 6B. Even though there is a small air gap between the point 41 and socket 42 on an individual lamination layer, such as adjacent layers, this air-gap is effectively filled with the magnetically-conductive, lamination material on the next neighboring layer, due to the overlapping area 82, as further illustrated with reference to FIGS. 10 and 10A. The net result is that the magnetic permeability and magnetic reluctance are nearly the same as if the lamination were not split into multiple stator sections. The overlapping area 82 can be made any length, but generally a greater amount of overlap provides an increased performance.

With reference again to FIG. 5, the magnetic circuit 78 is created by the rotor magnet 16, and the stator assembly 18. A magnetic flux 92 leaves the north pole 64 of the magnet 16, jumps across a magnetic air gap 94, and reaches a top of the left tooth 26 and top of right tooth 24. The magnetic flux 92 extends through the stator assembly 18 in a direction of bottom 96 of the left tooth 26 and bottom 98 of the right tooth 24, eventually the flux portion 100 jumping across the magnetic air gap 94 and back to the south pole 66 of the magnet 16.

With continued reference to FIG. 5 and reference again to FIGS. 2 and 3, to create torque output from the actuator 10, the coils 42, 44 of electrically conductive material may be placed around the left tooth 26 and/or the right tooth 24 of a stator sections 20, 22 and an electrical current circulated through the left and/or right coils effectively turning the respective tooth into an electromagnet. Although a single coil (the left coil 44 or the right coil 42) placed around a single tooth 24 or 26 of one stator section 20 or 22 will create torque output, placing a coil around each tooth 24, 26 desirably provides a higher torque output capability, and also provides more flexibility for the driving electronics as long as each coil wire is accessible by the driving electronics.

Speaking in terms of the actuator 10 that has the two stator sections 20, 22, one on the left 22 and one on the right 20, and with reference again to FIG. 5, when an electrical current is passed through the left coil 44 with such a polarity that the left top tooth portion 102 and left bottom tooth portion 104 become more north, this creates a clockwise rotational torque, because the north pole 64 of the magnet 16 will be repelled by the top 102 of the left tooth 26 and the south pole 66 of the magnet 16 will be attracted to the bottom 104 of left tooth 26. When the electrical current is reversed, the direction of the torque is also reversed. Torque is produced in proportion to the amount of electrical current applied to the coil 44. A desirable feature includes the coil or coils 42, 44 may be bidirectionally excitable for magnetizing the tooth or teeth 24, 26 to provide bidirectional torque to the rotor assembly 12.

On typical actuators that have teeth, normally each lamination layer is solid (i.e. not split into multiple sections), and each coil must be wound on a fully-assembled stator. Winding a coil on such a stator is difficult and expensive, since the wire must first exist externally, and must be placed on each tooth turn-by-turn. This is difficult because of the close proximity between actuator teeth. In addition, it is also difficult to achieve optimal copper packing using such an approach. Therefore this is a more expensive approach, and one that results in sub-optimal performance.

By contrast, due to the fact that the lamination structure 80 comprises discrete laminations 32, 34 employing a point-and-socket approach for embodiments of on the present invention, this allows the stator assembly 18 to be assembled as stator sections 20, 22. Because of this, the coils 42, 44 can be placed on each stator section 20, 22 very easily, since there is no other tooth to get in the way. The coils 42, 44 can be wound directly onto a stator section 20, 22 by machine, or, alternatively, the coils can be separately wound onto a bobbin, or formed using bondable magnet wire, and then simply slid onto the teeth 24, 26 of each stator section 20, 22. Once the coils 42, 44 are in place, the stator sections 20, 22 can be slid together. This construction provides a very inexpensive and easy way to assemble the stator assembly 18, and also allows for maximum conductor packing and thus, maximum actuator performance.

Although the laminations 32, 34 have been discussed as having a point-and-socket configuration 88, 90, it is also possible for the laminations to have a simple blunt edge, rounded edge, or other protrusion configurations, as long as the overlapping area 82 is provided between the layers of laminations. Of course, the point-and-socket configuration 88, 90 allows for easy assembly and thus is preferred.

Figure 11:
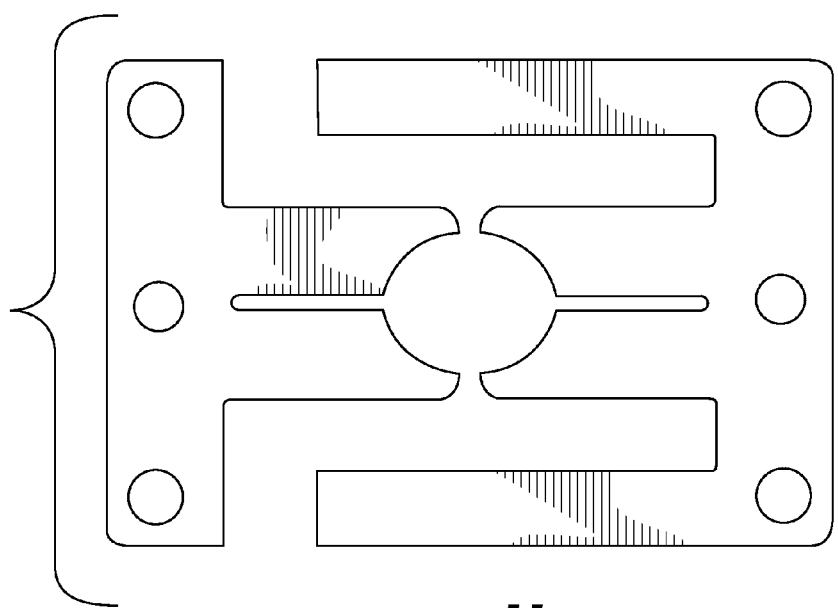
FIGS. 11 and 11A illustrate alternative embodiments to laminations which may be used in keeping with the teachings of the present invention.
Figure 11A:
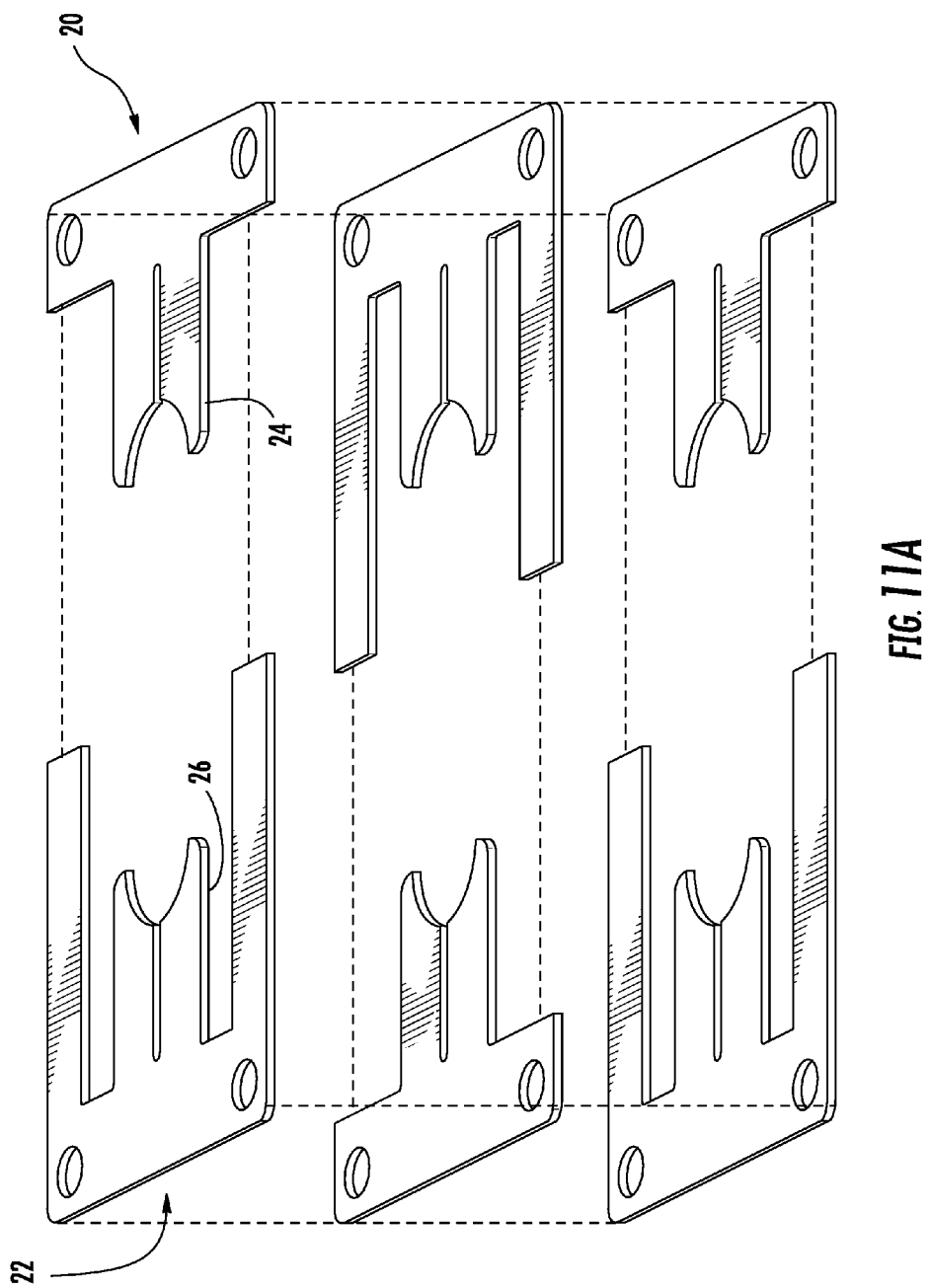

Further, although the laminations above described illustrate a single style of lamination, having a point and a socket which is alternated and used on all stator sections, it is also possible to have two or more separate styles of laminations and still lie within the scope of this invention. As a non-limiting example, FIG. 11 illustrates one lamination that generally forms the letter "T" not having first and second protrusions as above described, while another which generally forms the letter "W" for mating in a radial fashion with the "T" and having the first and second protrusions generally equal. As illustrated with reference to FIG. 11A, alternating such T and W laminations may form the laminations 80 earlier described with reference to FIGS. 6A, 6B and 10.

Figure 12:
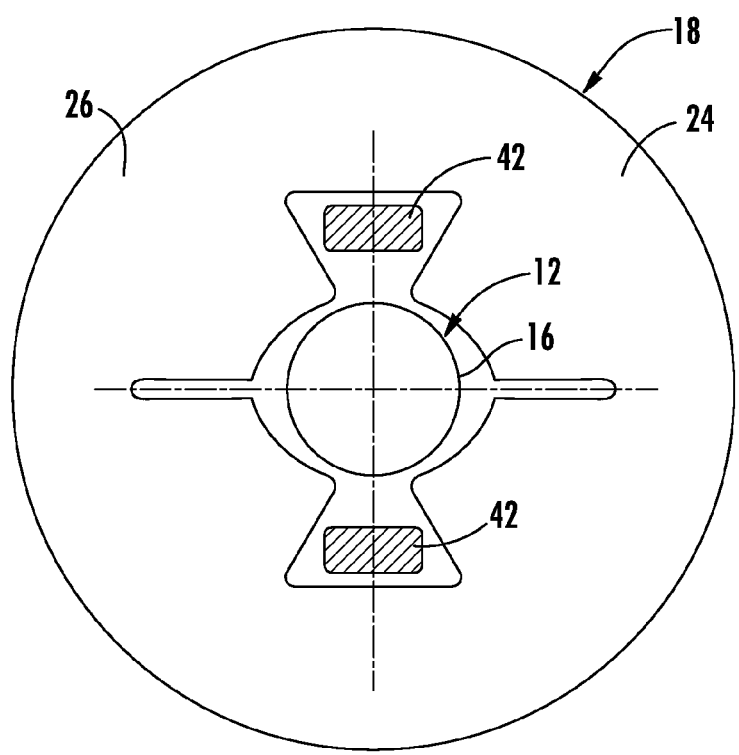
FIG. 12 illustrates a slotted embodiment of the invention. In this embodiment, the coils are not placed around radially-inwardly-facing teeth and instead the coils are placed in slots located radially outside the rotor magnet.
Figure 12A:
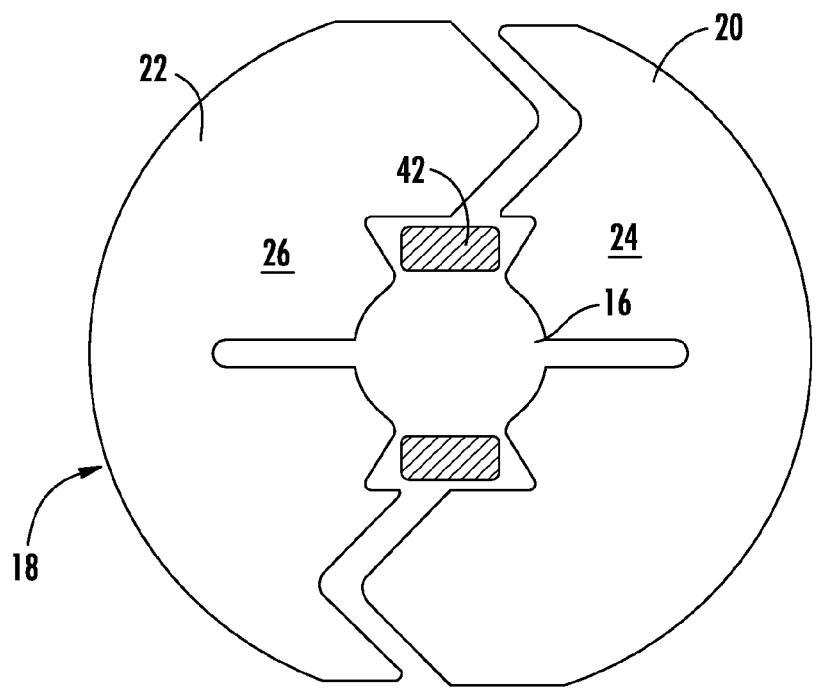
FIG. 12A illustrates one possible way in which the slotted embodiment may be split into sections.

By way of further example, and as illustrated with reference to FIG. 12, one magnetic circuit in keeping with the teachings of the present invention comprises a single coil 42 placed an area located radially outward from the rotor magnet 16 such that both teeth 24, 26 are excited by the single coil. This style of magnetic circuit can also be formed into a stator which is split into stator sections 20, 22 as illustrated with reference to FIG. 12A. As with the other stator embodiments above described, splitting the stator assembly 18 into sections 20, 22 allows for easy insertion of the coil 42 during assembly. All of the principals of operation discussed throughout this disclosure still apply, and for the purposes of understanding, the left portion of FIGS. 12 and 12A works in the same way as above described for the left tooth 26 of FIG. 5, and the right portion of FIGS. 12 and 12A works in the same way as the right tooth 24 of FIG. 5.

With reference again to FIG. 10, in an exemplary embodiment, the laminations 80 of the stator assembly 18 has a width 80W of 1 inch and a 80L of 1.5 inches, and an axial depth 80D of 0.9 inches, with each lamination 32, 34 being 0.025 inches thick. With reference again to FIGS. 2 and 3, the free-standing coils 42, 44 are each 0.3 inches wide, and each wound with 500 turns of AWG #33 bondable copper magnet wire, and are placed around each tooth 24, 26. When the two coils 42, 44 are connected in series, the resulting series resistance is approximately 50 ohms and inductance is approximately 190 millihenries. A peak torque output of the actuator 10 is 1,600,000 dyne-centimeters per amp (22.66 oz-inches per amp). Although these values are for an exemplary embodiment, they are not intended to be limiting.

With reference again to FIG. 7, to reduce angular position hysteresis and thus, improve angular position repeatability, each lamination tooth 24, 26 may incorporate a deep notch or slot 106. The deep notch 106 forces flux from the magnet 16 to completely circulate the entire length of the tooth 26. This also helps to keep the flux density within the tooth 24, 26 relatively constant as the rotational angle of the magnet 16 changes. Since the flux density within the lamination tooth 24, 26 remains relatively the same throughout a range of rotation angles, the magnetic permeability of the lamination material also remains relatively the same and thus, the coil inductance also remains relatively the same throughout a range of rotation angles.

When the coil inductance of an actuator changes depending on the rotation angle, this is called inductance modulation. In fact, with typical actuators, the inductance does change depending on the angle. An electromechanical actuator whose inductance does not change very much depending on the angle is highly desirable and thus, this is one need satisfied by the present invention.

With continued reference to FIG. 7, the deep notch 106 preferably has a depth 108 into the tooth 24, 26 that is generally as deep as the coil 42, 44 is wide 110, as illustrated with reference again to FIG. 5, although other depths will also work. The width 112 of the notch or slot 106 is not critical. However manufacturing techniques will generally dictate that the width 112 be at least as wide as the laminations 32, 34 are thick. The width 112 should generally be made no wider than a separation 114 between free ends of the teeth 24, 26. In an exemplary embodiment, the deep notch 106 is 0.030 inches wide, and the separation 114 between teeth 24, 26 is 0.040 inches. Although these dimensions are for an exemplary embodiment, they are not intended to be limiting.

Figure 13:
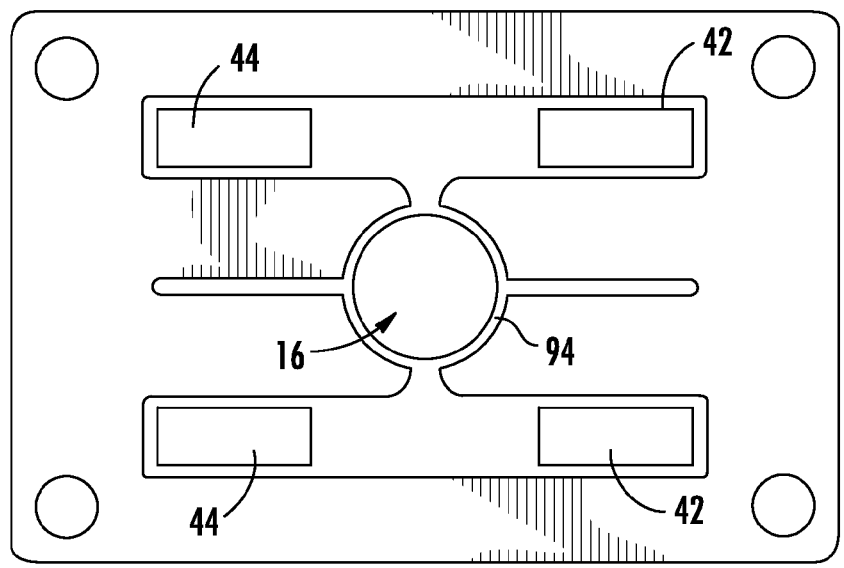
FIG. 13 illustrates a magnetic circuit whose air-gap is the same all the way around.
Figure 14:
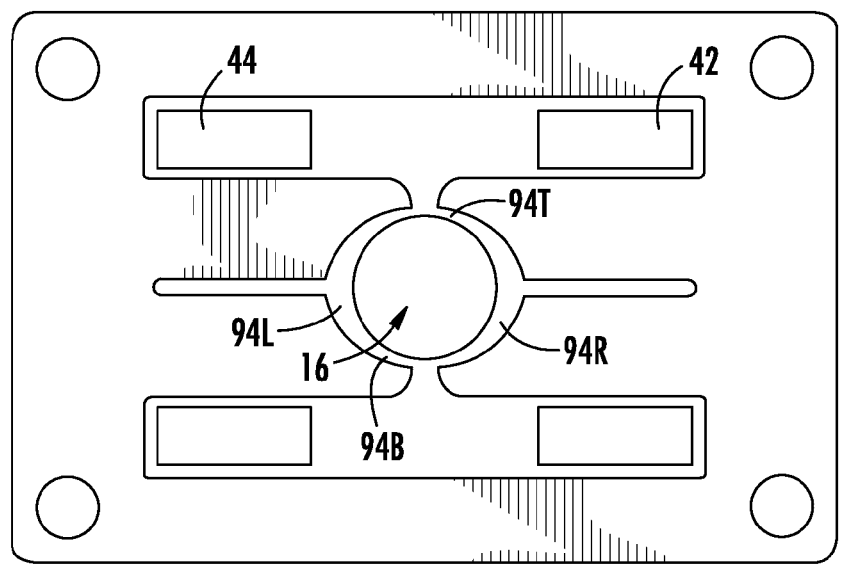
FIG. 14 illustrates a magnetic circuit whose air-gap is elliptical—i.e. wider on the left and right than it is on the top and bottom.

With reference now to FIG. 13, the magnetic air-gap 94, earlier described with reference to FIG. 5, may be made to be the same all the way around the magnet 16 as illustrated with reference to FIG. 13, or the magnetic air-gap 94 may wider on the left 94L and right 94R portions when compared with the air-gap at the top 94T and the bottom 94B portions, as illustrated with reference to FIG. 14, and as illustrated earlier with reference to FIG. 5. When the magnetic air-gap 94 is made to be the same all the way around the magnet 16, and no current is applied to the coils 42, 44, there will be a slight restoration torque placed on the magnet, tending to orient the north pole 64 toward +45 degree, −45 degree, +135 degree and −135 degree angular positions. Thus, in this configuration there are four "slightly preferred" angular positions when no current is applied to the coils 42, 44. By way of further example, the magnet 16 will orient itself in such a way to "prefer" four separate positions. Thus, there is a preference of the magnet 16. However, when the magnetic air-gap 94 is made wider on the left side, gap 94L, and the right side, gap 94R, of the magnet 16, and no current is applied to the coils 42, 44, there will be a strong restoration torque placed on the magnet 16, tending to orient the north pole 64 toward +90 degrees (straight up in the orientation of the drawing) or −90 degree (straight down in the orientation of the drawing) angular positions. Thus, in this configuration there are two "strongly-preferred" angular positions when no current is applied to the coils 42, 44. In keeping with the terminology as described above, the magnet 16 will have a very strong preference for two separate angular positions. The strength of this restoration torque depends on how much wider the air-gap is on the left side and right side, when compared to the top and bottom sides. This strongly-preferred angular position provides a spring-like return-to-center action (restoration torque) for the actuator, which is highly desirable.

Figure 15:
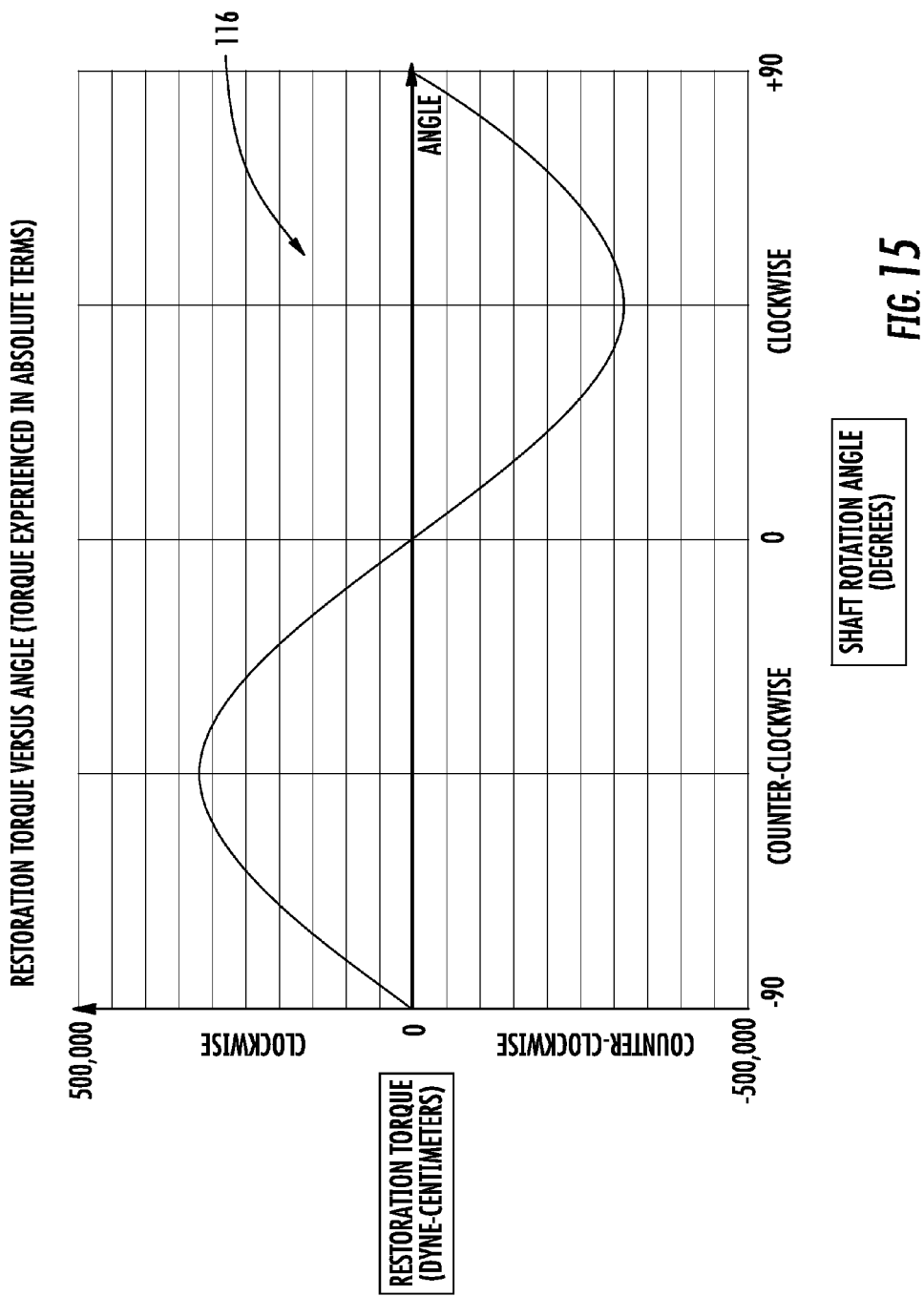
FIG. 15 illustrates the Restoration Torque versus Angle profile (in absolute terms) of the actuator of the present invention.

Moreover, the shape (circular or elliptical, as herein illustrated by way of example) of the magnetic air-gap 94 controls the linearity of torque-versus-angle profile of the restoration torque. When the magnetic air-gap 94 is constantly increasing from the top-bottom toward the left-right as shown in FIG. 14, the restoration torque-versus-angle profile 116 will be smooth and approximately sinusoidal as illustrated with reference to the plot of FIG. 15. However, if the magnetic air-gap 94 suddenly changes (i.e. if the shape has discontinuities) then the restoration torque-versus-angle profile will also have discontinuities.

Figure 16:
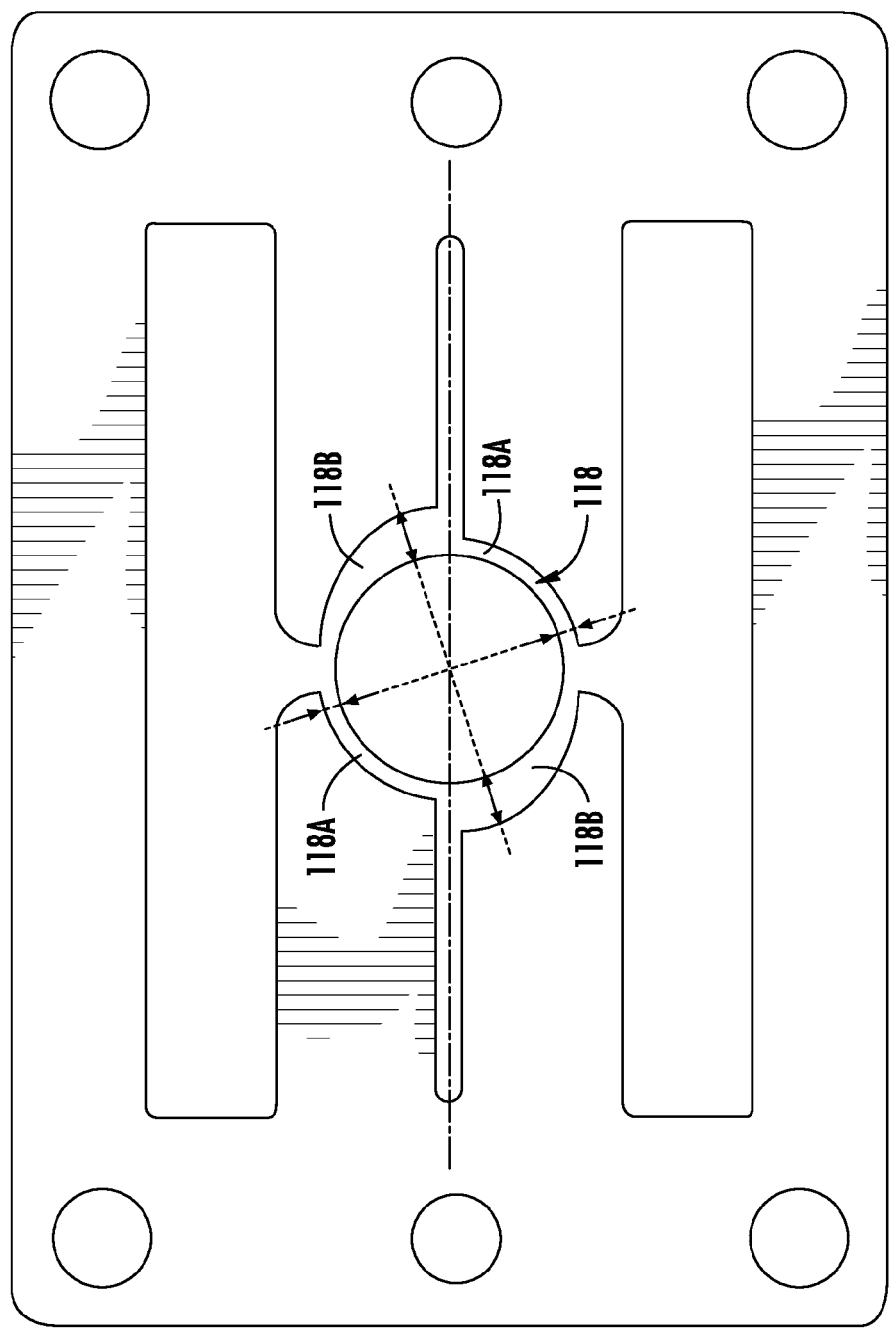
FIG. 16 illustrates a magnetic circuit with asymmetric air-gaps having a diametrically opposed portion whose air-gap is the same all the way around, and another diametrically opposed portion whose air-gap is elliptical.

As illustrated with reference to FIG. 16, one embodiment of the invention may include a magnetic circuit whose air-gap 118 is asymmetric, i.e. having one diametrically-opposed area whose air-gap 118A is the same all the way around a preselected area, and another diametrically-opposed area whose air-gap 118B changes throughout a preselected area. In such a case, the torque-versus-angle profile will be different for clockwise motion when compared to counter-clockwise motion. This may be desirable for "mirror flipper" applications.

In one exemplary embodiment, the shape of the magnetic air-gap 94 is made elliptical, having a top and bottom radius of 0.145 inches, and left and right radius of 0.185 inches. Given the exemplary cylindrical rotor magnet 16 having a 0.25 inch diameter 70 and 1 inch axial length 72 along with a stator assembly depth 80D of 0.9 inches, a peak restoration torque of around 318,150 dyne-centimeters results, or around 10,000 dyne-centimeters per degree over the central range of angles. Although these dimensions and values are for an exemplary embodiment, these are not intended to be limiting.

Further and in keeping with the teachings of the present invention, a stator assembly 18 may comprise some laminations whose air-gap is made to be the same all the way around the magnet 16, such as described with reference again to FIG. 13, and other laminations may have an air-gap made to be different, such as that described with reference again to FIG. 5. Yet further, one lamination or a preselected number of adjacent laminations may form one air-gap (FIG. 13) and another preselected number of laminations may form the different air-gap (FIG. 14).

Figure 17:
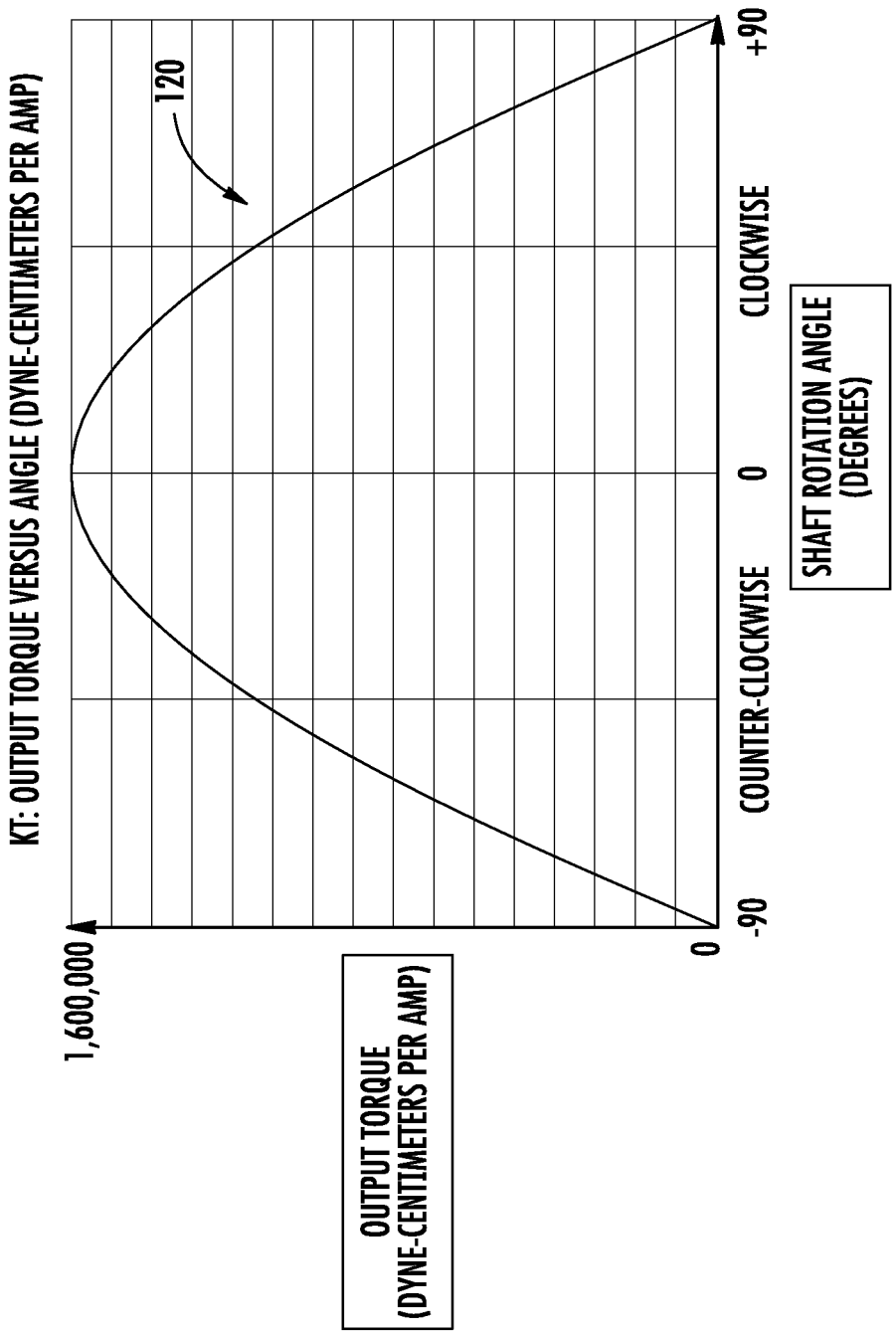
FIG. 17 illustrates the Output Torque versus Angle profile of the actuator of the present invention.
Figure 18:
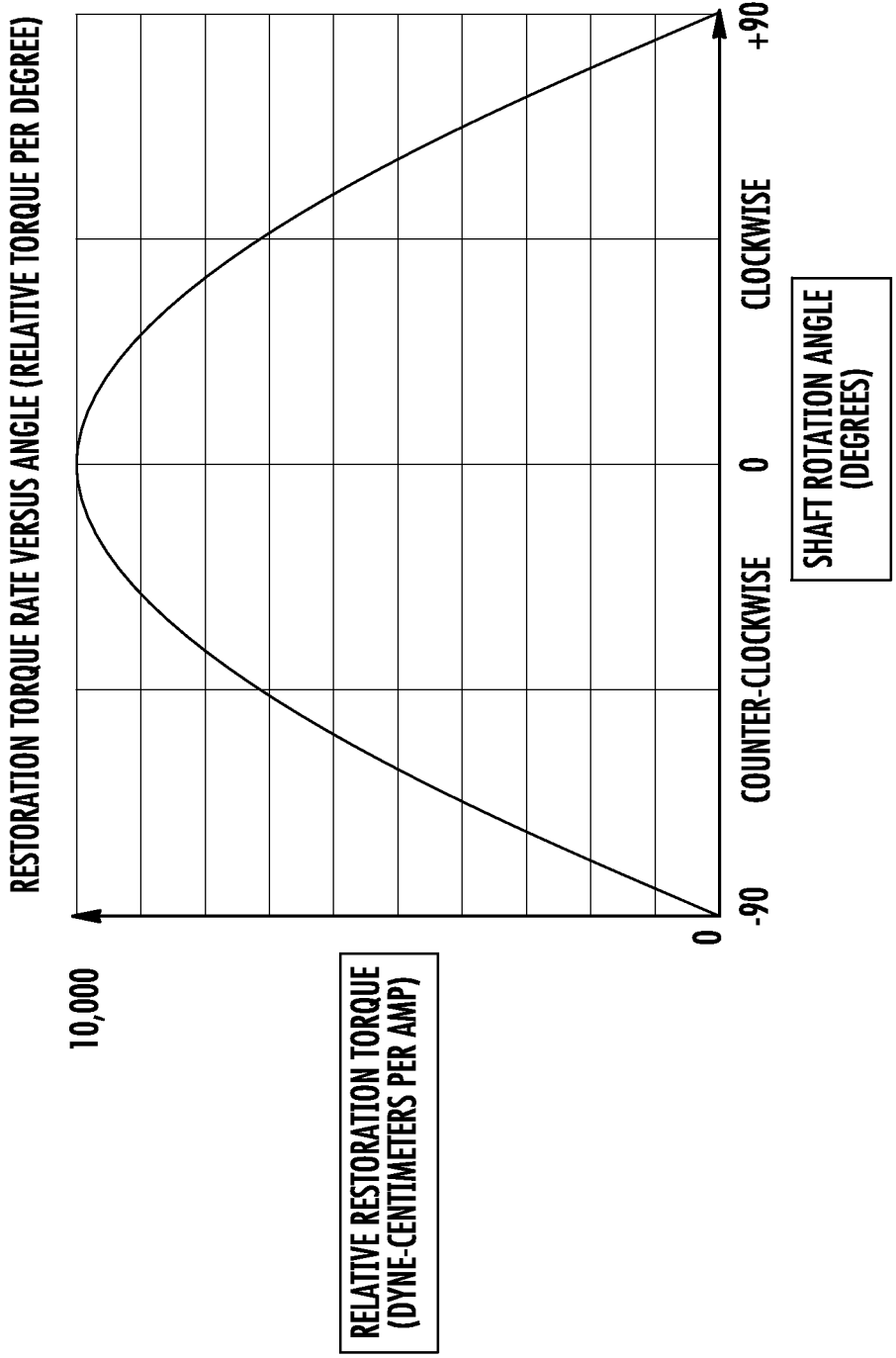
FIG. 18 illustrates the Restoration Torque Rate versus Angle profile (in relative terms) of the actuator of the present invention.
Figure 19:
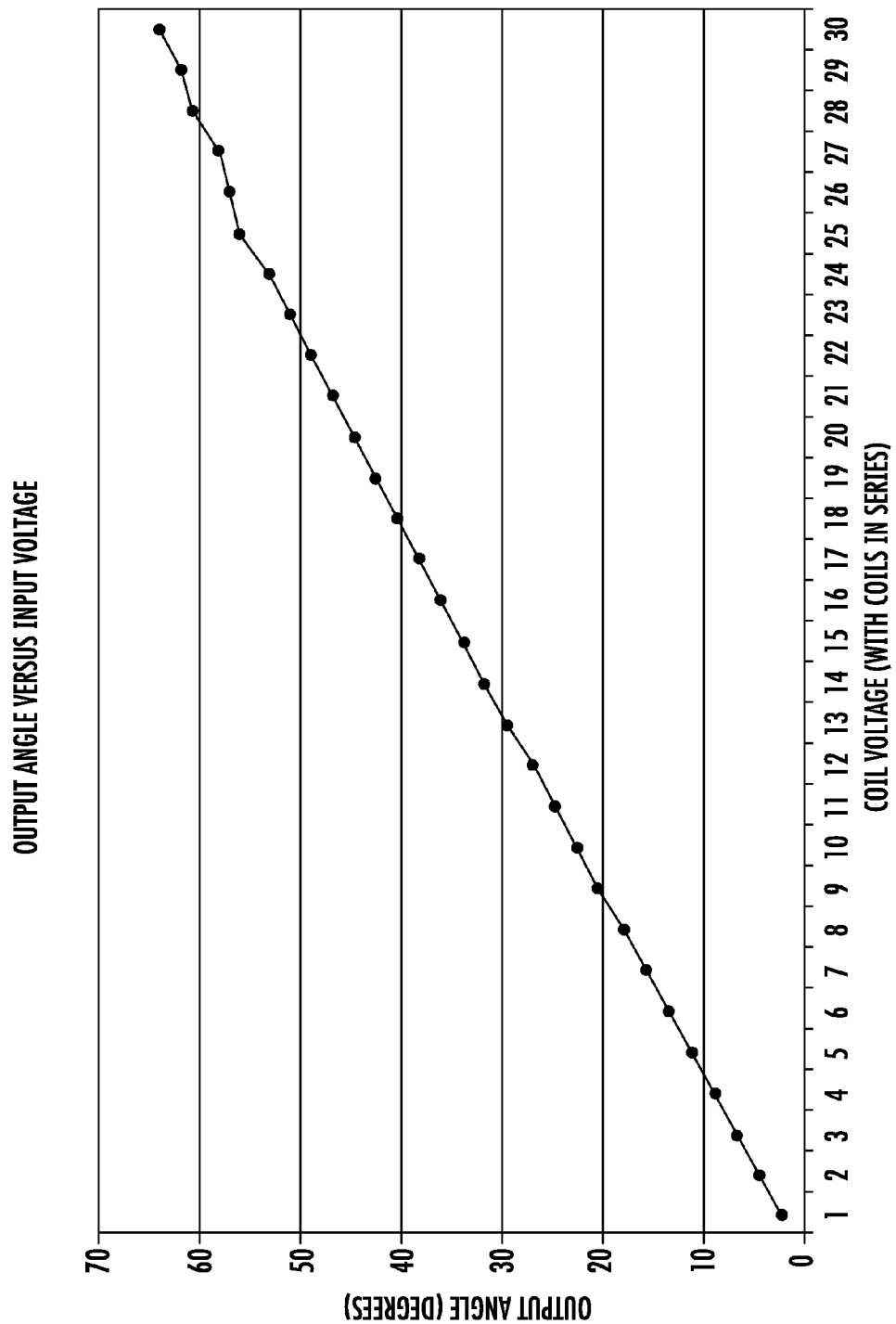
FIG. 19 illustrates an output angle versus input voltage profile by way of example for an actuator according to the teachings of the present invention.

By using the cylindrical magnet 16 that is diametral magnetized, a sinusoidal flux-versus-angle profile results. This in turn produces an approximately sinusoidal output-torque versus angle profile 120 for the actuator (when current is applied to the coils 42, 44), as illustrated with reference to FIG. 17. Moreover, as discussed above, using a magnetic air-gap 94 whose width continually increases from the top-bottom toward the left-right, an approximately sinusoidal spring-like return-to-center torque profile 122. 116 results, as illustrated with reference to FIG. 18, and again to FIG. 15. In this configuration, since the shape of the output-torque-versus-angle profile 120 (when current is applied to the coils) is the same as the spring-like restoration-torque versus angle (return-to-center) profile, the net result is that the output-angle versus input-current profile is nearly linear over an angle of around +/−60 mechanical degrees. By way of example, a resulting output angle versus input voltage profile is illustrated with reference to FIG. 19. The input current results from the input voltage driving both coils, herein connected in series. The actuator 10 of the present invention has a useful range of over +/−80 mechanical degrees, with some degradation in output-angle versus input-current linearity. The very wide angle capability and the very linear output-angle versus input-current profile are both unusual and highly desirable aspects of the present invention.

As illustrated with reference again to FIG. 17, a return-to-center restoration torque 120 resulting by making the magnetic air-gap 94 increase does indeed provide a "spring-like" action. This, coupled with the inertia of an external load creates a spring-mass system, which has a corresponding resonant frequency. When a pulse-type current is applied the actuator 10, this spring-mass system will overshoot and oscillate at the resonant frequency. Typically the oscillation may last for 10 or more cycles, which is a typical characteristic of actuators with spring-return and inertial loads. To reduce the overshoot and oscillation, damping is added.

In typical actuators, this damping is generally added externally, either using mechanical damping materials, or using electrical techniques, such as controlled drive impedance or back-emf feedback. In the present invention, one or more "shorted turns" may be used to add damping to the actuator.

In one embodiment of the present invention, a thin copper sleeve 124 is placed around one or both coils 42, 44, as illustrated by way of example with reference again to FIG. 2, wherein the sleeves 124 extend around a circumference of the coils. In an exemplary embodiment, each sleeve 124 is 0.290 inches wide and made with 0.020 inch thick copper. This provides roughly critical damping for the actuator given a typical inertial load.

With reference again to FIGS. 2 and 3, one embodiment includes the central struts 60A, 60B extending from the housing front face 50 toward the housing rear face 52. The electrically conductive struts 60A, 60B may have one end spaced from the housing face, wherein connection of electrically conductive screws 126 placed into the housing rear face 52 and attached to the struts 60A, 60B will effectively create a shorted turn that extends from the housing front face 50 through the struts 60A, 60B to the housing rear face 52. A desirable feature of such a structure is that the screws 126, herein illustrated as 126A, 126B, 126C and 126D can be completely removed if damping is provided externally, and also the degree of damping can be controlled based on the number of screws 126 that are used and the tightness of the screws 126, each of which controls the conductivity of the shorted turn.

In both embodiments described above, when a shorted-turn approach is used, actuator inductance is also greatly reduced, especially at high frequencies. For example, in an exemplary embodiment, inductance at 1 kHz is decreased from around 190 millihenries without the shorted turn technique to around 18 millihenries with the shorted turn technique.

While shorted turn techniques have been used on actuators, it has been for generally moving-coil actuators, not moving-magnet actuators. Moreover, an externally-adjustable self-damping action is another highly desirable and unusual aspect of the present invention.

Although a detailed description and drawings of the invention has been provided above, it is to be understood that the scope of the invention is not to be limited thereby, but is to be determined by the claims which follow.

Further, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electromechanical device operable as a limited rotation rotary actuator having a generally linear torque versus angle profile, the device comprising:
  a stator having an aperture extending axially therein, wherein the stator includes two teeth extending toward the aperture, the stator including multiple stator sections with a first stator section having a first tooth and a second stator section having a second tooth, wherein each tooth includes an elongate slot extending longitudinally through a free end of the tooth, wherein the aperture has an oval shape having a long axis aligned with a longitudinal axis of the opposing two teeth, and wherein the first stator section is integrally formed with the second stator section;

an electrical coil extending around at least one tooth, wherein the electrical coil has a width dimension, wherein the slot extends along the longitudinal axis of the tooth throughout the width dimension of the coil, and wherein the electrical coil is excitable for magnetizing the at least one tooth; and a rotor having a shaft and a cylindrical, solid diametral magnetized magnet operable therewith extending into the aperture, wherein an uneven gap is formed between the magnet and free ends of the teeth sufficient for providing a generally linear angle versus current profile characteristic during operation of the device and a spring-like return-to-center action for the rotor when not exciting the electrical coil.

2. The device according to claim 1, wherein the stator comprises a plurality of laminations forming multiple stator sections, and wherein a first stator section includes a first protrusion in spaced relation with a first tooth and a second stator section includes a second protrusion in spaced relation with a second tooth, the first protrusion having a first void therein for receiving the second protrusion therein, and the second protrusion having a corresponding second void therein for receiving the first protrusion therein in an overlapping manner to integrally form the first stator section with the second stator section.

3. The device according to claim 2, wherein each lamination in the plurality of laminations comprises at least one of a first protrusion portion and a second protrusion portion in spaced relation with a tooth portion carried therebetween.

4. The device according to claim 3, wherein the first protrusion portion comprises a first length dimension and the second protrusion portion comprises a second length dimension, the first length dimension greater than the second length.

5. The device according to claim 4, wherein the plurality of laminations is formed by stacking at least some of the laminations in an alternating manner with the first protrusion portion adjacent the second protrusion so as to form at least one of the first void and the second void between selected protrusion portions, and wherein the difference between the first and second length dimensions defines the overlapping.

6. The device according to claim 3, wherein a lamination portion within the first stator section radially opposing the lamination portion within the second stator section comprises first and second protrusion portions in spaced relation with and on opposing sides of a tooth portion.

7. The device according to claim 3, wherein lamination portions within the first stator section radially opposing lamination portions within the second stator section both comprise first and second protrusion portions in spaced relation with and on opposing sides of a tooth portion.

8. The device according to claim 2, wherein a free end of the first protrusion portion includes a first shape and a free end of the second protrusion includes a second shape, the first and second shapes dimensioned for mating when the first stator section is integrally formed with the second stator section.

9. The device according to claim 8, wherein the first and second shapes include convex and concave shapes, respectively.

10. The device according to claim 1, wherein the multiple stator sections comprise four stator sections, each having one tooth extending toward the aperture, and wherein the magnet comprises four diametral magnetized magnets.

11. The device according to claim 1, wherein the two teeth are aligned generally radially from an axis of the shaft.

12. The device according to claim 1, wherein each tooth includes an arcuate free end proximate the aperture and forming a portion thereof, and wherein the uneven gap extends generally around the magnet.

13. The device according to claim 1, further comprising a conductive sleeve covering the electrical coil, the sleeve dimensioned for providing a preselected damping effect to the rotor during operation of the device.

14. The device according to claim 1, further comprising;

a housing having opposing first and second electrically conductive face portions, wherein the stator is carried therebetween;

an electrically conductive strut extending between the face portions, wherein the electrical coil extends around each of the at least two teeth, and wherein the strut is positioned between the coils and thus within a magnetic circuit created thereby; and elongate elements adjustably securing at least one of the opposing face portions to the strut sufficient to provide a shorted turn.

15. The device according to claim 1, wherein the magnet comprises at least one of Neodymium Iron Boron material and Samarium Cobalt material.

16. The device according to claim 1, wherein the shaft comprises first and second shaft portions and the magnet carried axially therebetween.

17. An electromechanical device comprising:

a stator having an aperture extending axially therein, wherein the aperture has an oval cross sectional shape, and wherein the stator includes at least two teeth, with each tooth of the at least two teeth extending toward the aperture, wherein each tooth includes a slot longitudinally extending therein toward the aperture through a free end of the tooth;

a rotor having a shaft and a cylindrical, solid diametral magnetized magnet operable therewith extending into the oval shaped aperture, wherein an uneven gap is formed between the magnet and the at least two teeth sufficient for providing a generally linear angle versus current profile characteristic during operation of the device; and an electrical coil extending around at least a portion of one tooth of the at least two teeth, wherein the electrical coil is excitable for magnetizing the at least one tooth.

18. The device according to claim 17, wherein the stator is formed by a plurality of laminations, and wherein a width dimension of the slot is approximate at least a thickness dimension of each lamination of the plurality of laminations.

19. The device according to claim 17, wherein a width dimension of the slot is approximate a separation distance dimension between opposing teeth.

20. A method of assembling an electromechanical device for providing a limited rotation rotary actuator, the method comprising:

providing multiple stator sections, wherein a first stator section includes a first tooth, wherein a second stator section includes a second tooth, and wherein each tooth comprises an arcuate free end and includes a slot longitudinally extending through the free end;

forming an electrical coil around at least one tooth such that the slot extends along at least a width of the coil, wherein the electrical coil is excitable for magnetizing the at least one tooth;

integrally forming the first stator section with the second stator section for forming a stator having the two teeth and an aperture between the arcuate free ends thereof, the aperture having an oval shaped cross section; and extending a rotor having a shaft and a cylindrical, solid diametral magnetized magnet operable therewith into the aperture, wherein an uneven gap is formed between the magnet and the arcuate free ends of the teeth, the uneven gap sufficient for providing a generally linear angle versus current profile characteristic during operation of the device as a limited rotation rotary actuator, and providing a spring-like return-to-center action of the rotor when not exciting the coil.

21. The method according to claim 20, further comprising forming each of the stator sections with a plurality of laminations.

22. The method according to claim 21, further comprising forming each lamination with at least one of a first lamination protrusion portion and a second lamination protrusion portion, each lamination protrusion portion in spaced relation with a tooth lamination portion carried therebetween.

23. The method according to claim 22, further comprising forming the first lamination protrusion portion to have a first length dimension and the second lamination protrusion portion to have a second length dimension, the first length dimension greater than the second length.

24. The method according to claim 23, wherein each stator section is formed by stacking the plurality of laminations in an alternating manner with the first lamination protrusion portion adjacent the second lamination protrusion portion so as to form the voids within the stator sections, and wherein the difference between the first and second length dimensions defines the overlapping.

25. The method according to claim 21, wherein a free end of the first lamination protrusion portion includes a first shape and a free end of the second lamination protrusion includes a second shape, and wherein the placing step comprises mating the first and second shapes when the first stator section is integrally formed with the second stator section.

26. The method according to claim 21, further comprising forming a width dimension of the slot to approximately a thickness dimension of each lamination.

27. The method according to claim 20, wherein providing the multiple stator sections comprises providing four stator sections, each having one tooth extending toward the aperture, and wherein the magnet comprises two magnets.

28. The method according to claim 20, further comprising matching a width dimension of the slot to a separation distance dimension between free ends of the teeth.

29. The method according to claim 20, further comprising providing a preselected damping effect to the rotor during operation thereof by placing a conductive sleeve around the electrical coil and dimensioning the sleeve for providing the preselected damping effect.

30. The method according to claim 20, further comprising;
providing a housing having opposing first and second electrically conductive face portions, and affixing the stator therebetween;
extending an electrically conductive strut between the face portions, wherein the electrical coil extends around each of the at least two teeth, and wherein the strut is positioned between the coils and thus within a magnetic circuit created thereby; and
adjustably securing an elongate element to at least one of the opposing face portions to the strut sufficient to provide a shorted turn.

31. The method according to claim 20, further comprising selecting at least one of Neodymium Iron Boron material and Samarium Cobalt material for the magnet.

* * * * *